(12) United States Patent
Ylamurto et al.

(10) Patent No.: US 10,551,479 B1
(45) Date of Patent: Feb. 4, 2020

(54) SYSTEMS AND METHODS FOR USING RANGING TO DETERMINE LOCATIONS OF WIRELESS SENSOR NODES BASED ON RADIO FREQUENCY COMMUNICATIONS BETWEEN THE NODES AND VARIOUS RF-ENABLED DEVICES

(71) Applicant: Locix, Inc., San Bruno, CA (US)

(72) Inventors: Tommi Ylamurto, Los Gatos, CA (US); Manu Seth, Berkeley, CA (US); Lingkai Kong, Palo Alto, CA (US); Vivek Subramanian, Orinda, CA (US)

(73) Assignee: Locix, Inc., San Bruno, CA (US)

( * ) Notice: Subject to any disclaimer, the term of this patent is extended or adjusted under 35 U.S.C. 154(b) by 0 days.

(21) Appl. No.: 16/283,470

(22) Filed: Feb. 22, 2019

Related U.S. Application Data

(60) Provisional application No. 62/785,094, filed on Dec. 26, 2018.

(51) Int. Cl.
*H04W 24/00* (2009.01)
*G01S 5/02* (2010.01)
(Continued)

(52) U.S. Cl.
CPC .......... *G01S 5/0278* (2013.01); *G01S 5/0273* (2013.01); *G01S 5/0284* (2013.01);
(Continued)

(58) Field of Classification Search
CPC ............. H04W 52/143; H04W 52/146; H04W 52/243; H04W 52/244; H04W 72/0413;
(Continued)

(56) References Cited

U.S. PATENT DOCUMENTS

| 6,694,142 B1 * | 2/2004 | Kuwahara | ................. G01S 5/14 |
| | | | 342/357.29 |
| 8,401,560 B2 * | 3/2013 | Potkonjak | ............. H04W 64/00 |
| | | | 455/446 |

(Continued)

OTHER PUBLICATIONS

Office Action from U.S. Appl. No. 16/283,478, dated Nov. 5, 2019, 18 pages.

*Primary Examiner* — Joseph Arevalo
(74) *Attorney, Agent, or Firm* — Jaffery Watson Mendonsa & Hamilton LLP

(57) ABSTRACT

Systems, apparatuses, and methods for determining locations of wireless nodes in a network architecture are disclosed herein. In one example, a system for localization of nodes in a wireless network architecture comprises a plurality of wireless anchor nodes each having a known location and a wireless device with one or more processing units and RF circuitry for transmitting and receiving communications in the wireless network architecture and a wireless node having a wireless device with a transmitter and a receiver to enable bi-directional communications with the plurality of wireless anchor nodes in the wireless network architecture. One or more processing units of at least one of the plurality of wireless anchor nodes are configured to execute instructions to determine a set of possible ranges between each anchor node and the wireless node having an unknown location and to perform a triangulation algorithm that iterates through possible locations of the wireless node to minimize error.

18 Claims, 23 Drawing Sheets

(51) Int. Cl.
*H04W 64/00* (2009.01)
*H04W 4/33* (2018.01)
*H04B 17/309* (2015.01)
*H04W 4/029* (2018.01)
*H04W 4/38* (2018.01)
*H04W 24/10* (2009.01)

(52) U.S. Cl.
CPC .......... *H04B 17/309* (2015.01); *H04W 4/029* (2018.02); *H04W 4/33* (2018.02); *H04W 4/38* (2018.02); *H04W 24/10* (2013.01); *H04W 64/003* (2013.01)

(58) Field of Classification Search
CPC ......... H04W 72/0473; H04W 72/1263; H04W 24/10; H04W 64/003

USPC .... 455/67.11, 456.1, 404.2, 456.3, 423, 457, 455/450, 445, 406, 453.3, 411
See application file for complete search history.

(56) References Cited

U.S. PATENT DOCUMENTS

| | | | |
|---|---|---|---|
| 9,596,042 B2* | 3/2017 | Siomina | H04W 24/10 |
| 10,142,793 B2* | 11/2018 | Pandharipande | H04W 4/029 |
| 10,270,642 B2* | 4/2019 | Zhang | H04L 27/362 |
| 2005/0080924 A1* | 4/2005 | Shang | G06K 9/6251 709/239 |
| 2005/0195109 A1* | 9/2005 | Davi | G01S 5/0226 342/463 |
| 2006/0212570 A1 | 9/2006 | Aritsuka | |
| 2008/0032708 A1* | 2/2008 | Guvenc | G01S 5/0215 455/456.2 |
| 2008/0100505 A1* | 5/2008 | Malinovskiy | G01S 13/87 342/357.4 |
| 2013/0225200 A1* | 8/2013 | Ben Hamida | G01S 5/0289 455/456.1 |
| 2015/0023439 A1* | 1/2015 | Dimou | H04B 15/00 375/260 |
| 2016/0057708 A1* | 2/2016 | Siomina | H04W 52/243 455/452.2 |
| 2016/0349353 A1* | 12/2016 | Wang | G01S 5/14 |
| 2017/0212210 A1* | 7/2017 | Chen | G01S 5/06 |
| 2017/0356979 A1* | 12/2017 | Georgiou | G01S 5/0215 |
| 2018/0100915 A1* | 4/2018 | Beko | G01S 5/12 |
| 2018/0183650 A1* | 6/2018 | Zhang | G01S 13/00 |

* cited by examiner

901 CALIBRATE, WITH THE PROCESSING LOGIC, AT LEAST ONE COMPONENT (E.G., AUTOMATIC GAIN CONTROL (AGC) STAGE OF THE RF CIRCUITRY, FILTER STAGE OF THE RF CIRCUITRY, ETC.) THAT HAS A DELAY WITH THE CALIBRATION OF AT LEAST ONE COMPONENT INCLUDING MEASURING A DELAY OF THE AT LEAST ONE COMPONENT (E.G., AGC STAGE AS A FUNCTION OF GAIN, FILTER STAGE) DETERMINING IF A DEVIATION EXISTS BETWEEN THE MEASURED DELAY AND A BASELINE DELAY OF THE AT LEAST ONE COMPONENT, AND CORRECTING A TIMING OF THE DETERMINED TIME OF FLIGHT ESTIMATE IF A DEVIATION EXISTS.

902 TRANSMIT, WITH THE HUB (OR ANCHOR NODE, WIRELESS DEVICE, REMOTE DEVICE OR COMPUTER) HAVING RADIO FREQUENCY (RF) CIRCUITRY AND AT LEAST ONE ANTENNA, COMMUNICATIONS TO A PLURALITY OF SENSOR NODES IN THE WIRELESS NETWORK ARCHITECTURE (E.G., WIRELESS ASYMMETRIC NETWORK ARCHITECTURE).

903 RECEIVE, WITH THE RF CIRCUITRY AND AT LEAST ONE ANTENNA OF THE HUB (OR ANCHOR NODE, WIRELESS DEVICE, REMOTE DEVICE OR COMPUTER), COMMUNICATIONS FROM THE PLURALITY OF SENSOR NODES EACH HAVING A WIRELESS DEVICE WITH A TRANSMITTER AND A RECEIVER TO ENABLE BI-DIRECTIONAL COMMUNICATIONS WITH THE RF CIRCUITRY OF THE HUB IN THE WIRELESS NETWORK ARCHITECTURE.

905 INITIALLY CAUSE, WITH THE PROCESSING LOGIC OF A HUB (OR ANCHOR NODE, WIRELESS DEVICE, REMOTE DEVICE OR COMPUTER) HAVING A WIRELESS CONTROL DEVICE, A WIRELESS NETWORK OF SENSOR NODES TO BE CONFIGURED AS A MESH-BASED NETWORK ARCHITECTURE FOR A TIME PERIOD (E.G., PREDETERMINED TIME PERIOD, TIME PERIOD SUFFICIENT FOR LOCALIZATION, ETC.).

906 DETERMINE, WITH THE PROCESSING LOGIC OF THE HUB (OR ANCHOR NODE, WIRELESS DEVICE, REMOTE DEVICE OR COMPUTER), CSI DATA FROM THE RF SIGNALS TRANSMITTED AND RECEIVED BETWEEN WIRELESS DEVICES.

908 EDGES OF THE FREQUENCY SPECTRUM, SUCH AS THE HIGHEST AND LOWEST SUBCARRIERS OF THE RF SIGNALS ARE REMOVED OR DISCARDED

910 PERFORM INTERPOLATION OVER DIRECT CURRENT (DC) SUBCARRIERS OF THE RF SIGNALS THAT DO NOT HAVE THESE CSI MEASUREMENTS

911 DETERMINE WITH A WIRELESS DEVICE A DELAY DUE TO PHASE DRIFT BETWEEN THE WIRELESS DEVICE BY DIVIDING THE FORWARD CSI BY REVERSE CSI

```
┌─────────────────────────────────────────────────────────────────────┐
│  DETERMINE A SET OF POSSIBLE RANGES BETWEEN EACH ANCHOR NODE AND THE │
│           WIRELESS NODE HAVING AN UNKNOWN LOCATION.                  │
│                              1004                                    │
└─────────────────────────────────────────────────────────────────────┘
                                  ▼
┌─────────────────────────────────────────────────────────────────────┐
│   ADD WEIGHTED RANGE DISTRIBUTIONS TOGETHER IF MULTIPLE RANGE VALUES │
│                         PER ANCHOR NODE                              │
│                              1006                                    │
└─────────────────────────────────────────────────────────────────────┘
                                  ▼
┌─────────────────────────────────────────────────────────────────────┐
│  GIVEN A RANGE DISTRIBUTION FROM EACH ANCHOR NODE, COMPUTE A LIKELIHOOD │
│   OF A RANGE AND POSITION HYPOTHESIS AS BEING PRODUCT OF RANGES AND  │
│         POSITION HYPOTHESIS FROM DIFFERENT ANCHOR NODES.             │
│                              1008                                    │
└─────────────────────────────────────────────────────────────────────┘
                                  ▼
┌─────────────────────────────────────────────────────────────────────┐
│          CONVERT THE PRODUCT INTO A SUM BY USING A LOGARITHM         │
│                              1010                                    │
└─────────────────────────────────────────────────────────────────────┘
                                  ▼
┌─────────────────────────────────────────────────────────────────────┐
│        PERFORM A TRIANGULATION ALGORITHM THAT UTILIZES A MAXIMUM     │
│   LIKELIHOOD ESTIMATION (MLE) BY SELECTING A HYPOTHESIS WITH A HIGHEST │
│                           PROBABILITY.                               │
│                              1012                                    │
└─────────────────────────────────────────────────────────────────────┘
                                  ▼
```

1701 UPON INITIALIZATION OF A WIRELESS NETWORK ARCHITECTURE, A WIRELESS NODE (E.G., ANCHOR NODE, WIRELESS DEVICE, HUB) HAVING RADIO FREQUENCY (RF) CIRCUITRY AND AT LEAST ONE ANTENNA TRANSMITS COMMUNICATIONS TO A PLURALITY OF SENSOR NODES IN THE WIRELESS NETWORK ARCHITECTURE (E.G., WIRELESS ASYMMETRIC NETWORK ARCHITECTURE).

1702 RECEIVE, WITH THE RF CIRCUITRY AND AT LEAST ONE ANTENNA OF THE WIRELESS NODE, COMMUNICATIONS FROM THE PLURALITY OF SENSOR NODES EACH HAVING A WIRELESS DEVICE WITH A TRANSMITTER AND A RECEIVER TO ENABLE BI-DIRECTIONAL COMMUNICATIONS WITH THE RF CIRCUITRY OF THE WIRELESS NODE IN THE WIRELESS NETWORK ARCHITECTURE.

1704 PROCESSING LOGIC OF THE WIRELESS NODE HAVING A WIRELESS CONTROL DEVICE INITIALLY CAUSES A WIRELESS NETWORK OF SENSOR NODES TO BE CONFIGURED AS A MESH-BASED NETWORK ARCHITECTURE FOR A TIME PERIOD (E.G., PREDETERMINED TIME PERIOD, TIME PERIOD SUFFICIENT FOR LOCALIZATION, ETC.) FOR LOCALIZATION OF AT LEAST ONE WIRELESS DEVICE.

1706 PERFORM WITH THE WIRELESS NODE RANGING WITH THE SENSOR NODES (ANY OR ALL PAIR COMBINATIONS BETWEEN WIRELESS NODES AND WIRELESS SENSOR NODES) TO DETERMINING RANGING DATA INCLUDING DISTANCE ESTIMATES BETWEEN NODES.

1708 USE A SET OF KNOWN LOCATIONS (E.G., WIFI ROUTER 892 OF FIGURE 8B, AIR CONDITIONING UNIT, CORNER REGION 894, ETC.) WITHIN AN ENVIRONMENT (E.G., INDOOR ENVIRONMENT, BUILDING, EXTERIOR REGION ADJACENT TO A BUILDING) AND DEVICE TO DEVICE RANGING DATA TO ASSOCIATE EACH WIRELESS NODE OR WIRELESS SENSOR NODE WITH A UNIQUE KNOWN LOCATION.

1710 USE AT LEAST ONE OF BRUTE FORCE CALCULATION, TRIANGULATION, AND NUMERICAL OPTIMIZERS TO DETERMINE THE LOCATIONS OF ANCHOR NODES (E.G., WIRELESS NODES, WIRELESS SENSOR NODES) THAT CORRESPOND TO THE MEASURED RANGING DATA

1712 ADJUST THE ROTATION, TRANSLATION, AND MIRRORING OF THE SUBSET OF ANCHOR LOCATIONS TO ALIGN THEM TO A PHYSICAL DESCRIPTION OF THE SPACE OR ENVIRONMENT

1714 UTILIZE ANCHOR NODES AND ASSOCIATED ANCHOR LOCATIONS FOR RANGING MEASUREMENTS BETWEEN THE ANCHOR NODES AND ANY NODES HAVING AN UNKNOWN LOCATION (E.G., FIXED OR MOVING LOCATIONS)

1716 USE AT LEAST ONE OF BRUTE FORCE CALCULATION, TRIANGULATION, AND NUMERICAL OPTIMIZERS TO DETERMINE THE UNKNOWN LOCATIONS FOR NODES (E.G., WIRELESS NODES, WIRELESS SENSOR NODES) THAT CORRESPOND TO THE MEASURED RANGING DATA

1718 CONFIGURE THE WIRELESS NETWORK IN A TREE BASED OR TREE-LIKE NETWORK ARCHITECTURE (OR TREE ARCHITECTURE WITH NO MESH-BASED FEATURES) UPON COMPLETION OF LOCALIZATION

FIG. 18

1801 — UPON INITIALIZATION OF A WIRELESS NETWORK ARCHITECTURE, A WIRELESS NODE (E.G., ANCHOR NODE, WIRELESS DEVICE, HUB) HAVING RADIO FREQUENCY (RF) CIRCUITRY AND AT LEAST ONE ANTENNA TRANSMITS COMMUNICATIONS TO A PLURALITY OF SENSOR NODES IN THE WIRELESS NETWORK ARCHITECTURE (E.G., WIRELESS ASYMMETRIC NETWORK ARCHITECTURE).

1802 — RECEIVE, WITH THE RF CIRCUITRY AND AT LEAST ONE ANTENNA OF THE WIRELESS NODE, COMMUNICATIONS FROM THE PLURALITY OF SENSOR NODES EACH HAVING A WIRELESS DEVICE WITH A TRANSMITTER AND A RECEIVER TO ENABLE BI-DIRECTIONAL COMMUNICATIONS WITH THE RF CIRCUITRY OF THE WIRELESS NODE IN THE WIRELESS NETWORK ARCHITECTURE.

1804 — PROCESSING LOGIC OF THE WIRELESS NODE HAVING A WIRELESS CONTROL DEVICE INITIALLY CAUSES A WIRELESS NETWORK OF SENSOR NODES TO BE CONFIGURED AS A MESH-BASED NETWORK ARCHITECTURE FOR A TIME PERIOD (E.G., PREDETERMINED TIME PERIOD, TIME PERIOD SUFFICIENT FOR LOCALIZATION, ETC.) FOR LOCALIZATION OF AT LEAST ONE WIRELESS DEVICE.

1806 — PERFORM WITH THE WIRELESS NODE RANGING WITH THE SENSOR NODES (ANY OR ALL PAIR COMBINATIONS BETWEEN WIRELESS NODES AND WIRELESS SENSOR NODES) TO DETERMINING RANGING DATA INCLUDING DISTANCE ESTIMATES BETWEEN NODES.

1808 — USE DEVICE TO DEVICE RANGING DATA TO ASSOCIATE AT LEAST ONE WIRELESS NODE OR WIRELESS SENSOR NODE WITH A RELATIVE LOCATION. RELATIVE LOCATIONS OF ALL ANCHOR NODES OR AT LEAST A SUBSET OF ANCHOR NODES ARE DETERMINED USING AT LEAST ONE OF OPTIMIZATION TECHNIQUES, BRUTE FORCE METHODS, OR PROBABILISTIC METHODS

1810 — ADJUST THE ROTATION, TRANSLATION, AND MIRRORING OF A FULL SET OF RELATIVE POSITIONS TO ALIGN THEM TO A PHYSICAL DESCRIPTION OF THE SPACE OR ENVIRONMENT

1812 — DETERMINE ANCHOR NODES AND THEIR CALCULATED POSITION WITHIN THE SPACE OF ENVIRONMENT

1814 — UTILIZE ANCHOR NODES AND THEIR ASSOCIATED ANCHOR POSITIONS FOR RANGING MEASURMENTS BETWEEN THE ANCHOR NODES AND ANY NODES HAVING AN UNKNOWN LOCATION

1816 — USE AT LEAST ONE OF BRUTE FORCE CALCULATION, TRIANGULATION, AND NUMERICAL OPTIMIZERS TO DETERMINE THE UNKNOWN LOCATIONS FOR NODES (E.G., WIRELESS NODES, WIRELESS SENSOR NODES) THAT CORRESPOND TO THE MEASURED RANGING DATA

1818 — CONFIGURE THE WIRELESS NETWORK IN A TREE BASED OR TREE-LIKE NETWORK ARCHITECTURE (OR TREE ARCHITECTURE WITH NO MESH-BASED FEATURES) UPON COMPLETION OF LOCALIZATION

SYSTEMS AND METHODS FOR USING RANGING TO DETERMINE LOCATIONS OF WIRELESS SENSOR NODES BASED ON RADIO FREQUENCY COMMUNICATIONS BETWEEN THE NODES AND VARIOUS RF-ENABLED DEVICES

RELATED APPLICATIONS

This application claims the benefit of U.S. Provisional Application No. 62/785,094, filed on Dec. 26, 2018, the entire contents of which are hereby incorporated by reference herein. This application is related to application Ser. No. 16/283,465, filed Feb. 22, 2019, entitled: SYSTEMS AND METHODS FOR DETERMINING LOCATIONS OF WIRELESS SENSOR NODES BASED ON RADIO FREQUENCY COMMUNICATIONS BETWEEN THE NODES AND VARIOUS RF-ENABLED DEVICES; application Ser. No. 16/283,474, filed Feb. 22, 2019, entitled: SYSTEMS AND METHODS FOR USING RANGING AND TRIANGULATION TO DETERMINE LOCATIONS OF WIRELESS SENSOR NODES BASED ON RADIO FREQUENCY COMMUNICATIONS BETWEEN THE NODES AND VARIOUS RF-ENABLED DEVICES; and application Ser. No. 16/283,478, filed Feb. 22, 2019, entitled: SYSTEMS AND METHODS FOR DETERMINING LOCATIONS OF WIRELESS SENSOR NODES BASED ON ANCHORLESS NODES AND KNOWN ENVIRONMENT INFORMATION, the entire contents of which are hereby incorporated by reference herein.

FIELD

Embodiments of the invention pertain to systems and methods for determining locations of wireless sensor nodes based on radio frequency communications between the nodes and various RF-enabled devices.

BACKGROUND

In the consumer electronics and computer industries, wireless sensor networks have been studied for many years. In archetypal wireless sensor networks, one or more sensors are implemented in conjunction with a radio to enable wireless collection of data from one or more sensor nodes deployed within a network. Each sensor node may include one or more sensors and will include a radio and a power source for powering the operation of the sensor node. Location detection of nodes in indoor wireless networks is useful and important in many applications. However, prior approaches for location detection of nodes suffer from reliability issues, deployment issues, and cost.

SUMMARY

For one embodiment of the present invention, systems and methods for determining locations of wireless sensor nodes in a network architecture are disclosed herein. In one example, a system for localization of nodes in a wireless network architecture includes a first wireless node having a wireless device with one or more processing units and RF circuitry for transmitting and receiving communications in the wireless network architecture including a first RF signal having a first packet. The system also includes a second wireless node having a wireless device with a transmitter and a receiver to enable bi-directional communications with the first wireless node in the wireless network architecture including a second RF signal with a second packet. The one or more processing units of the first wireless node, a machine, or a remote device (e.g., cloud based device) are configured to execute instructions to determine a round trip time estimate of the first and second packets, to determine channel state information (CSI) of the first and second wireless nodes, and to calibrate hardware to determine hardware delays of the first and second wireless nodes.

In one example, the first and second wireless nodes have the same reference clock signal.

In another example, a system for localization of nodes in a wireless network architecture, comprises a plurality of wireless anchor nodes each having a known location and a wireless device with one or more processing units and RF circuitry for transmitting and receiving communications in the wireless network architecture; and a wireless node having a wireless device with a transmitter and a receiver to enable bi-directional communications with the plurality of wireless anchor nodes in the wireless network architecture, wherein one or more processing units of at least one of the plurality of wireless anchor nodes are configured to execute instructions to determine a set of possible ranges between each anchor node and the wireless node having an unknown location and to perform a triangulation algorithm that iterates through possible locations of the wireless node to minimize error.

In another example, a system for localization of nodes in a wireless network architecture, comprises a plurality of wireless anchor nodes each having a known location and a wireless device with one or more processing units and RF circuitry for transmitting and receiving communications in the wireless network architecture; and a wireless node having a wireless device with a transmitter and a receiver to enable bi-directional communications with the plurality of wireless anchor nodes in the wireless network architecture, wherein one or more processing units of at least one of the plurality of wireless anchor nodes are configured to execute instructions to determine a set of possible ranges between each anchor node and the wireless node having an unknown location and to perform a triangulation algorithm that utilizes a maximum likelihood estimation (MLE) of ranging measurements from anchor nodes.

In another example, an apparatus for localization of nodes in a wireless network architecture, comprises a memory for storing instructions; one or more processing units to execute instructions for controlling a plurality of wireless sensor nodes in a wireless network architecture and determining locations of the plurality of wireless sensor nodes; and radio frequency (RF) circuitry to transmit communications to and receive communications from the plurality of wireless sensor nodes each having a wireless device with a transmitter and a receiver to enable bi-directional communications with the RF circuitry of the apparatus in the wireless network architecture, wherein the one or more processing units of the apparatus are configured to execute instructions to determine ranging data including a set of possible ranges between the apparatus and the plurality of wireless sensor nodes having unknown locations, and to associate each of the apparatus or the wireless sensor nodes with a unique known location within an environment of the wireless network architecture.

In another example, a system for localization of nodes in a wireless network architecture, comprises a wireless node having a wireless device with one or more processing units and RF circuitry for transmitting and receiving communications in the wireless network architecture; and a plurality of wireless sensor nodes having a wireless device with a transmitter and a receiver to enable bi-directional communications with the wireless node in the wireless network architecture, wherein one or more processing units of the wireless node are configured to execute instructions to determine ranging data including a set of possible ranges between the wireless node and the plurality of wireless sensor nodes having unknown locations, and to associate a set of relative locations within an environment of the wireless network architecture with the wireless node and the plurality of wireless sensor nodes.

Other features and advantages of embodiments of the present invention will be apparent from the accompanying drawings and from the detailed description that follows below.

BRIEF DESCRIPTION OF THE DRAWINGS

Embodiments of the present invention are illustrated by way of example and not limitation in the figures of the accompanying drawings, in which like references indicate similar elements, and in which:

FIGS. 9A-9B illustrate a method for localization of wireless devices that utilizes accurate timing determination of TOA within a wireless sensor network in accordance with one embodiment.

FIG. 10 illustrates a method for Maximum Likelihood Estimation (MLE) that is used to improve the accuracy of triangulation for localization in accordance with one embodiment.

FIG. 17 illustrates a method for localization of wireless devices that utilizes building information of a wireless sensor network in accordance with one embodiment.

FIG. 18 illustrates a method for localization of wireless devices with no building information of a wireless sensor network in accordance with one embodiment.

DETAILED DESCRIPTION

Figure 1A:
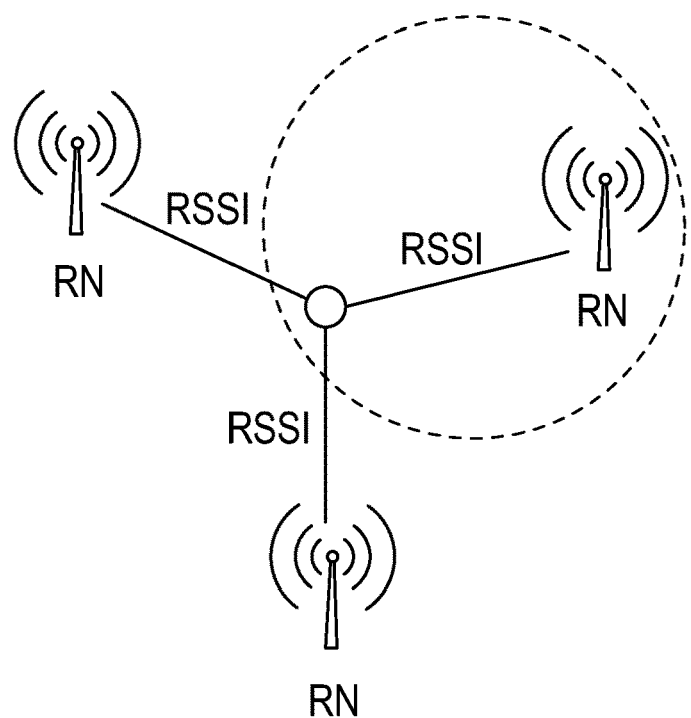
FIG. 1A illustrates position determination using signal strength.

Systems and methods for determining location of wireless sensor nodes using radio frequency communications between the nodes and various RF-enabled devices are described herein. Time of arrival is combined with techniques to mitigate the effect of multipath issues and to overcome sampling limitations to facilitate highly accurate ranging. This highly accurate ranging is then combined with techniques to facilitate accurate triangulation to deliver improved accuracy of location determination even in indoor environments.

In various applications of wireless sensor networks, it may be desirable to determine the location of sensor nodes within the network. For example, in wireless sensor networks, knowledge of location can add context to sensed data. In one example, knowledge of location in temperature sensing networks can enable mapping of temperature variations. Thus, it is desirable for systems and methods to enable location detection of nodes in wireless networks. Determination of location may be used to facilitate such applications as asset tracking, location context-based marketing and information, indoor navigation, and improved connectivity provisioning and configuration. While GPS delivers reasonable location services in clear outdoor environments, indoor location services remain inadequate today.

RF-based location services typically make use of one or more RF transceivers in known locations (often called "anchors") and a target object with an unknown location that is to be determined. RF communications are performed between the anchors and the target object and the location is determined based on these communications. The overall process is typically described in two operations—ranging and triangulation. In the ranging operation, RF communication is performed between an anchor and the object to determine the distance between the anchor and the object. This is repeated for multiple anchors to obtain a set of ranges. These are then used in the triangulation operation to determine the position of the object in three dimensional space. Typically, sufficient anchors are used to allow for some error reduction through redundancy in the triangulation process.

Note that in alternative implementations, angles of arrival may be used rather than a calculated distance. In this system, the triangulation process accounts for the individual angles between the anchors and the object to determine the estimated location of the target object. In both systems, the need for RF communication between the anchors and the object, the need for one or more anchors, and the nature of the RF communication sets performance and cost limits on the localization service.

The accuracy of a location service is typically provided as a numerical measure of the position as determined by the service versus the actual physical location. In particular, location services in indoor environments are often prone to outliers, where a few location determinations may be significantly erroneous, despite the fact that many measurements deliver good accuracy. As a consequence, while a quoted numerical accuracy may appear to be sufficient for a given application, in fact, the outliers may make the effective reliability of the localization so poor as to be unusable in practice.

Depending on the application, the time to achieve location estimation may be an important parameter as well. For example, real time indoor navigation services may require responsiveness of a single second or less to enable accurate navigation guidance. Asset tracking or context-based services, on the other hand, may be provided with slower location services.

The range of a location service describes the maximum distance over which location can be determined. In an RF-based location system, this characterizes the maximum separation between the minimum number of anchors to achieve location service functionality and also the separation between these anchors and the target object to be located. Obviously, the greater the range, the more sparse the location infrastructure requirements, reducing cost of deployment.

All location services ultimately require the deployment of infrastructure used to facilitate the location determination of the object in question. In a typical RF-based location service of the types discussed herein, this would include the deployment of anchors with known location as well as the implementation of the requisite RF communication functionality on both the anchors and the target object to be located. As such, therefore, there is a cost associated with implementation of any location service that accounts for all of this. This cost depends on the density of anchors deployed (which relates to range), the need for dedicated infrastructure, the proprietary nature of the technology used, etc. U.S. application Ser. No. 15/789,603, entitled "SYSTEMS AND METHODS FOR USING RADIO FREQUENCY SIGNALS AND SENSORS TO MONITOR ENVIRONMENTS" discloses the use of a moving anchor (e.g., via a robot) to reduce the need for multiple separate anchors. This technique may be used herein. U.S. application Ser. No. 15/789,603 is incorporated by reference.

Indoor environments are typically difficult environments for RF-based location services. In particular, the ranging or angle determination process that is used as the first operation in localization is particularly sensitive to reflections that commonly exist in indoor environments. These reflections result in multiple paths forming for the RF signal to propagate between the communicating radios on the anchor(s) and the object. This so-called multipath problem can result in erroneous determination of range or angle. For example, if a path that includes a reflection is misidentified as the range between an anchor and the object, it results in an overestimation of the range versus a direct path. This can then result in errors in triangulation. Indoor location services are highly prone to these multipath effects, leading to outliers, where certain locations result in very large errors. Any robust indoor location service must correctly deal with these multipath effects to deliver good accuracy with minimal outliers.

In addition to multipath effects, attenuation of signals can be a serious problem as well. RF signals are generally attenuated more strongly in indoor environments due to absorption of signals by walls, etc. This in turn can directly introduce error in the measurements, or, at the very least, can reduce the effective range of the system, necessitating the use of more anchors. If the anchor cost is high, this can significantly impact cost of deployment.

Finally, the overall cost of deployment can be a serious challenge. Given the range and multipath concerns with indoor environments, multiple anchors are commonly needed to provide adequate error correction and provide sufficient indoor coverage given the increased attenuation. Should these anchors require expensive hardware that is solely dedicated for location service provision, this can make the solution non-viable for cost of deployment reasons alone.

Figure 1B:
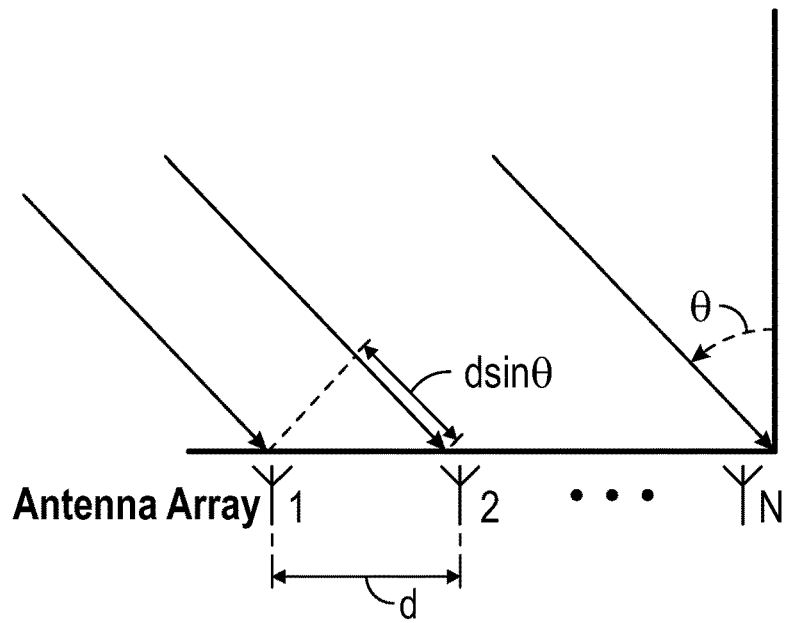
FIG. 1B illustrates position determination using angle of arrival.
Figure 1C:
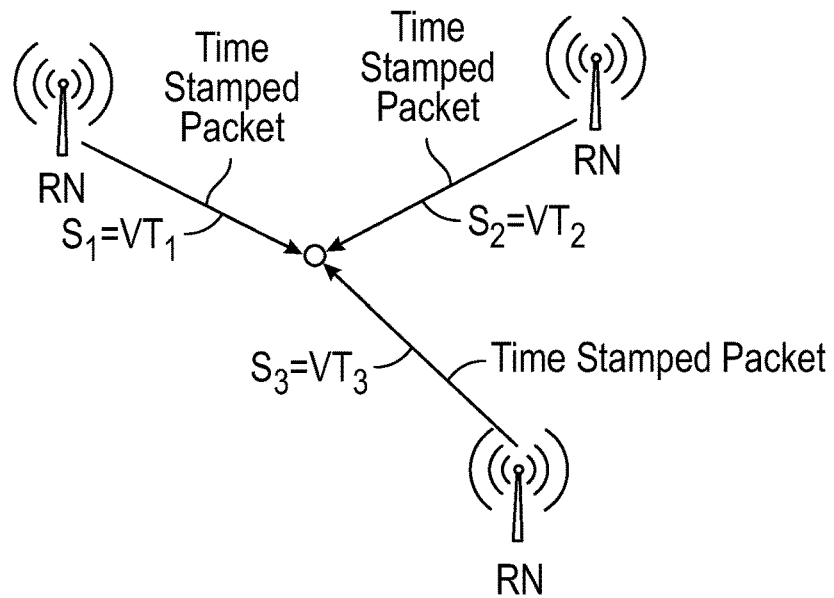
FIG. 1C illustrates position determination using time of arrival.

Exemplar prior indoor localization technologies can be subdivided into a few main categories based on their choice of frequency/protocol. These include those based on 2.4 GHz ZigBee solutions, those based on 2.4 GHz Bluetooth solutions, those based on Wi-Fi (at both 2.4 GHz and 5 GHz) and those based on Ultra-wide band (UWB) at >5 GHz. In addition to categorization based on frequency/protocol, such technologies can also be characterized based on their method of position determination. Position determination is typically achieved, for example, using one or more of signal strength as illustrated in FIG. 1A, angle of arrival as illustrated in FIG. 1B, or time of arrival as illustrated in FIG. 1C.

Figure 2:
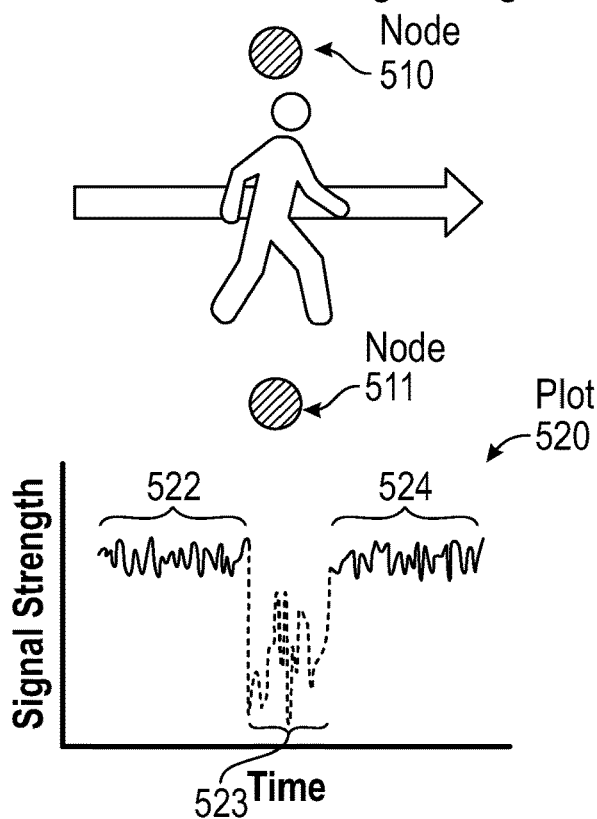
FIG. 2 illustrates RSSI being used to estimate the distance between two nodes 510 and 511.

In a system based on signal strength, the distance is estimated based on the attenuation of an RF signal that increases with increased separation between the transmitter and receiver. By quantifying the receiving signal strength indication (RSSI), it is possible to attempt to relate this to distance between the objects based on assumptions related to attenuation. These distances can then be measured to several anchors, and triangulated to estimate position, or alternatively, can be used in conjunction with a single or a few anchors to indicate general proximity to a particular anchor. RSSI is unfortunately highly variable due to such factors as walls, people in the environment, etc., and, as such, RSSI based systems typically deliver poor positional accuracy. This is discussed in U.S. application Ser. No. 14/988,617, which is incorporated by reference herein. For example, if RSSI is being used to estimate the distance between two nodes 510 and 511 in FIG. 2, when a person walks through the RF propagation region, the RSSI value can drop dramatically due to the absorption and reflection induced by the person. If the distance estimation algorithm assumes that distance varies inversely in relation to signal strength, then the algorithm will erroneously conclude that the distance between the two nodes is much larger than the actual value.

In a system based on angle of arrival (AOA), a multi-antenna system is commonly used to estimate an orientation vector for the angle of the incoming signal. By using multiple such measurements to different anchors, it is possible to estimate location as the intersection of the vectors to the different anchors. In practice AOA systems are typically expensive to implement due to the need for sophisticated antenna systems.

In Time of arrival (TOA) systems, the time for a signal to propagate from a transmitter to a receiver is used to estimate distance between the same. Since the speed of propagation is relatively fixed, such systems are much more robust than RSSI-based systems, and also do not require the antenna sophistication of AOA systems. Such TOA systems have been deployed in 2.4 GHz, 5 GHz, and UWB implementations with varying degrees of success. On the other hand, such systems are susceptible to multipath effects, since a dominant reflected signal will have a longer TOA that a weaker direct path, and, if selected as the distance, may cause significant error in the position calculation. Additionally, since time is the measured parameter, such systems are heavily affected by the sampling clock accuracy of the time measurement system, and also show a strong dependence on the signal bandwidth; wider bandwidth systems typically show much better multipath tolerance, reduced outliers, and overall improved accuracy.

Location information may be used to estimate the relative position of sensors such as security cameras, motion sensors, temperature sensors, and other such sensors as would be apparent to one of skill in the art. This information may then be used to produce augmented information such as maps of temperature, motion paths, and multi-view image captures. Therefore, localization systems and methods are desired to enable accurate, low-power, and context-aware localization of nodes in wireless networks, particularly in indoor environments. For the purpose of this, indoor environments are also assumed to include near-indoor environments such as in the region around building and other structures, where similar issues (e.g., presence of nearby walls, etc.) may be present.

A wireless sensor network is described for use in an indoor environment including homes, apartments, office and commercial buildings, and nearby exterior locations such as parking lots, walkways, and gardens. The wireless sensor network may also be used in any type of building, structure, enclosure, vehicle, boat, etc. having a power source. The sensor system provides good battery life for sensor nodes while maintaining long communication distances.

Embodiments of the invention provide systems, apparatuses, and methods for localization detection in indoor environments. U.S. patent application Ser. No. 14/830,668 filed on Aug. 19, 2015, which is incorporated by reference herein, discloses techniques for RF-based localization. Specifically, the systems, apparatuses, and methods implement localization in a wireless sensor network that primarily uses a tree network structure for communication with periodic mesh-based features for path length estimation when localization is needed. The wireless sensor network has improved accuracy of localization while simultaneously providing good quality of indoor communication by using high-frequencies for localization and lower frequencies for communication.

Tree-like wireless sensor networks are attractive for many applications due to their reduced power requirements associated with the radio signal reception functionality. An exemplar tree-like network architecture has been described in U.S. patent application Ser. No. 14/607,045 filed on Jan. 29, 2015, U.S. patent application Ser. No. 14/607,047 filed on Jan. 29, 2015, U.S. patent application Ser. No. 14/607,048 filed on Jan. 29, 2015, and U.S. patent application Ser. No. 14/607,050 filed on Jan. 29, 2015, which are incorporated by reference in entirety herein.

Another type of wireless network that is often used is a mesh network. In this network, communication occurs between one or more neighbors, and information may then be passed along the network using a multi-hop architecture. This may be used to reduce transmit power requirements, since information is sent over shorter distances. On the other hand, receive radio power requirements may increase, since it is necessary for the receive radios to be on frequently to enable the multi-hop communication scheme.

Based on using the time of flight of signals between nodes in a wireless network, it is possible to estimate distance between individual pairs of nodes in a wireless network by exploiting the fact that the speed of signal propagation is relatively constant. Embodiments of the present network architecture allow measuring multiple pairs of path lengths and performing triangulation and then estimating the relative location of individual nodes in three-dimensional space.

Figure 3:
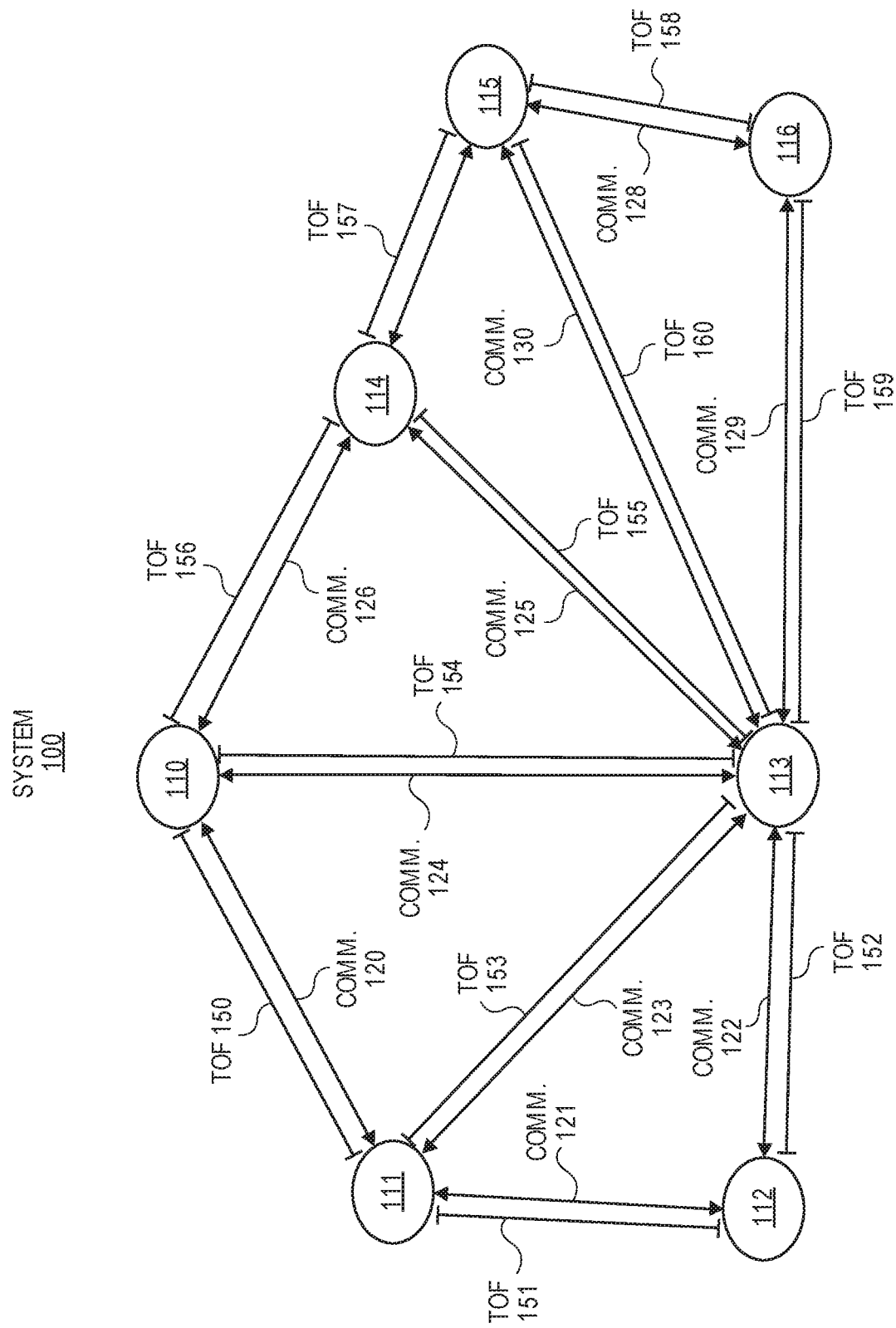
FIG. 3 illustrates an exemplar system of wireless nodes in accordance with one embodiment.

FIG. 3 illustrates an exemplar system of wireless nodes in accordance with one embodiment. This exemplar system 100 includes wireless nodes 110-116. The nodes communicate bi-directionally with communications 120-130 (e.g., node identification information, sensor data, node status information, synchronization information, localization information, other such information for the wireless sensor network, time of flight (TOF) communications, etc.). Based on using time of flight measurements, path lengths between individual pairs of nodes can be estimated. An individual time of flight measurement between nodes 110 and 111 for example, can be achieved by sending a signal at a known time from node 110 to node 111. Node 111 receives the signal, records a time stamp of reception of the signal of the communications 120, and can then, for example, send a return signal back to A, with a time stamp of transmission of the return signal. Node 110 receives the signal and records a time stamp of reception. Based on these two transmit and receive time stamps, an average time of flight between nodes 110 and 111 can be estimated. This process can be repeated multiple times and at multiple frequencies to improve precision and to eliminate or reduce degradation due to poor channel quality at a specific frequency. A set of path lengths can be estimated by repeating this process for various node pairs. For example, in FIG. 3, the path lengths are TOF 150-160. Then, by using a geometric model, the relative position of individual nodes can be estimated based on a triangulation-like process.

In one example, a moving anchor node (e.g., via a robot) is used to reduce the need for multiple separate anchor nodes. For example, nodes 111 and 112 can be replaced with a moving anchor node 190 that has a first position at node 112 and a second position at node 111.

This triangulation process is not feasible in a tree-like network, since only path lengths between any node and a hub can be measured. This then limits localization capability of a tree network. To preserve the energy benefits of a tree network while allowing localization, in one embodiment of this invention, a tree network for communication is combined with mesh-like network functionality for localization. Once localization is complete with mesh-like network functionality, the network switches back to tree-like communication and only time of flights between the nodes and the hub are measured periodically. Provided these time of flights are held relatively constant, the network then assumes nodes have not moved and does not waste energy is attempting to re-run mesh-based localization. On the other hand, when a change in path length in the tree network is detected, the network switches to a mesh-based system and re-triangulates to determine location of each node in the network.

Figure 4:
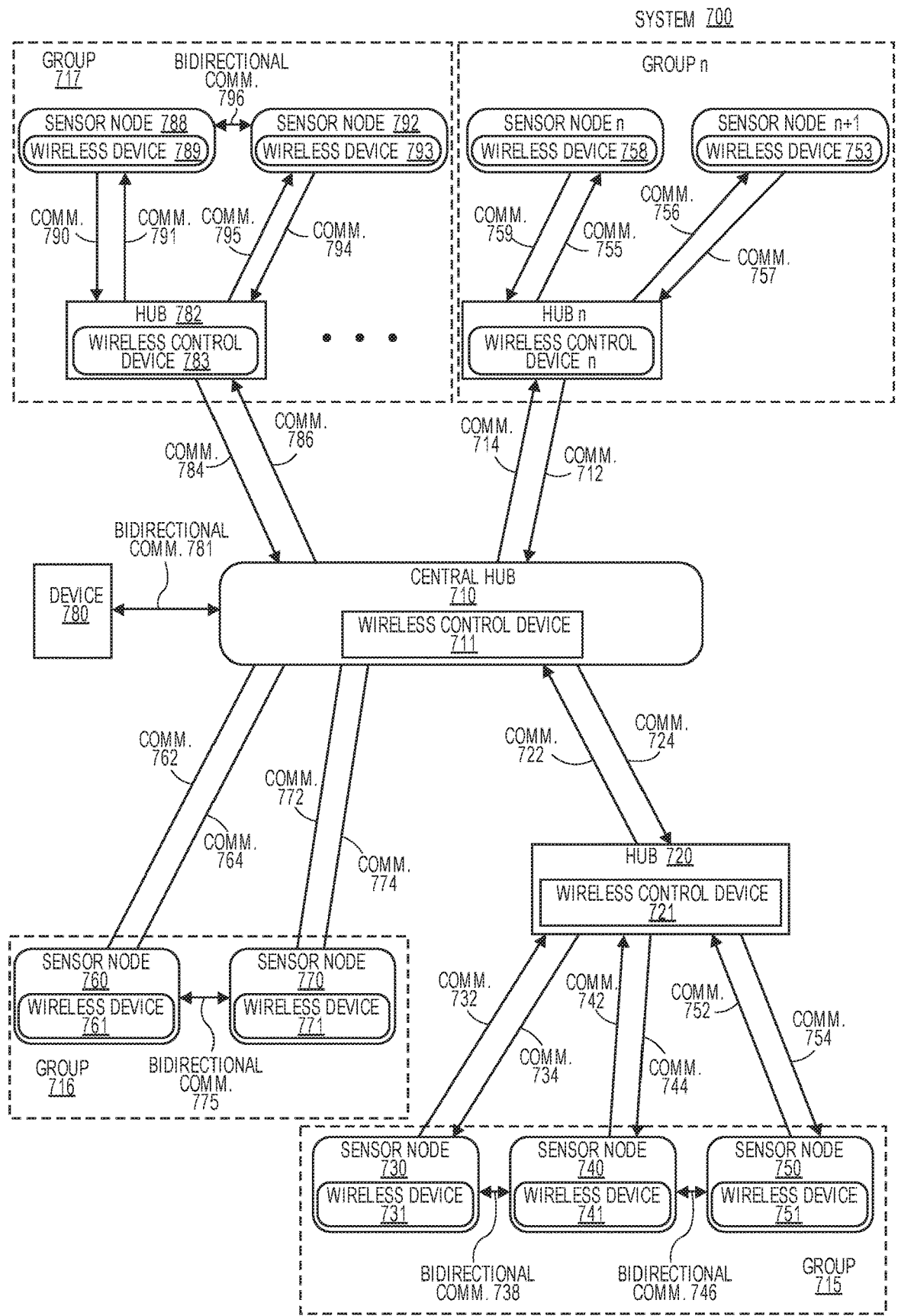
FIG. 4 shows a system with an asymmetric tree and mesh network architecture having multiple hubs for communicating in accordance with one embodiment.

FIG. 4 shows a system with an asymmetric tree and mesh network architecture having multiple hubs for communicating in accordance with one embodiment. The system 700 includes a central hub 710 having a wireless control device 711, hub 720 having a wireless control device 721, hub 782 having a wireless control device 783, and additional hubs including hub n having a wireless control device n. Additional hubs which are not shown can communicate with the central hub 710, other hubs, or can be an additional central hub. Each hub communicates bi-directionally with other hubs and one or more sensor nodes. The hubs are also designed to communicate bi-directionally with other devices including device 780 (e.g., client device, mobile device, tablet device, computing device, smart appliance, smart TV, etc.).

The sensor nodes 730, 740, 750, 760, 770, 788, 792, n, and n+1 (or terminal nodes) each include a wireless device 731, 741, 751, 761, 771, 789, 793, 758, and 753, respectively. A sensor node is a terminal node if it only has upstream communications with a higher level hub or node and no downstream communications with another hub or node. Each wireless device includes RF circuitry with a transmitter and a receiver (or transceiver) to enable bi-directional communications with hubs or other sensor nodes.

In one embodiment, the central hub 710 communicates with hubs 720, 782, hub n, device 780, and nodes 760 and 770. These communications include communications 722, 724, 774, 772, 764, 762, 781, 784, 786, 714, and 712 in the wireless asymmetric network architecture. The central hub having the wireless control device 711 is configured to send communications to other hubs and to receive communications from the other hubs for controlling and monitoring the wireless asymmetric network architecture including assigning groups of nodes and a guaranteed time signal for each group.

The hub 720 communicates with central hub 710 and also sensors nodes 730, 740, and 750. The communications with these sensor nodes include communications 732, 734, 742, 744, 752, and 754. For example, from the perspective of the hub 720, the communication 732 is received by the hub and the communication 734 is transmitted to the sensor node. From the perspective of the sensor node 730, the communication 732 is transmitted to the hub 720 and the communication 734 is received from the hub.

In one embodiment, a central hub (or other hubs) assign nodes 760 and 770 to a group 716, nodes 730, 740, and 750 to a group 715, nodes 788 and 792 to a group 717, and nodes n and n+1 to a group n. In another example, groups 716 and 715 are combined into a single group.

By using the architectures illustrated in FIGS. 3-4, nodes requiring long battery life minimize the energy expended on communication and higher level nodes in the tree hierarchy are implemented using available energy sources or may alternatively use batteries offering higher capacities or delivering shorter battery life. To facilitate achievement of long battery life on the battery-operated terminal nodes, communication between those nodes and their upper level counterparts (hereafter referred to as lowest-level hubs) may be established such that minimal transmit and receive traffic occurs between the lowest-level hubs and the terminal nodes.

In one embodiment, the nodes spend most of their time (e.g., more than 90% of their time, more than 95% of their time, approximately 98% or more than 99% of their time) in a low-energy non-communicative state. When the node wakes up and enters a communicative state, the nodes are operable to transmit data to the lowest-level hubs. This data may include node identification information, sensor data, node status information, synchronization information, localization information and other such information for the wireless sensor network.

Figure 5:
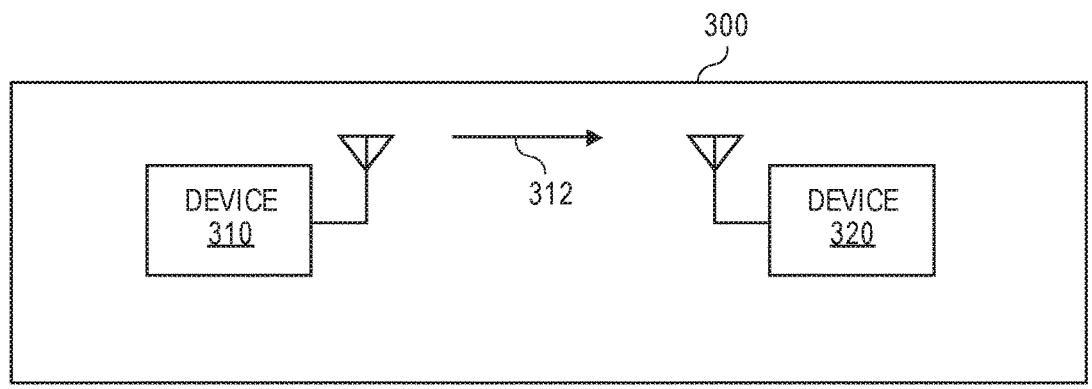
FIG. 5 illustrates a time of flight measurement system in accordance with one embodiment.

To determine the distance between two objects based on RF, ranging measurements are performed (i.e., RF communication is used to estimate the distance between the pair of objects). To achieve this, an RF signal is sent from one device to another. FIG. 5 illustrates a time of flight measurement system in accordance with one embodiment. A transmitting device 310 sends an RF signal 312, and a receiving device 320 receives the RF signal 312, as shown in FIG. 5. Here, in an exemplary wireless network, the device 310 may be a hub or a node, and the device 320 may also be a hub or a node.

Figure 6:
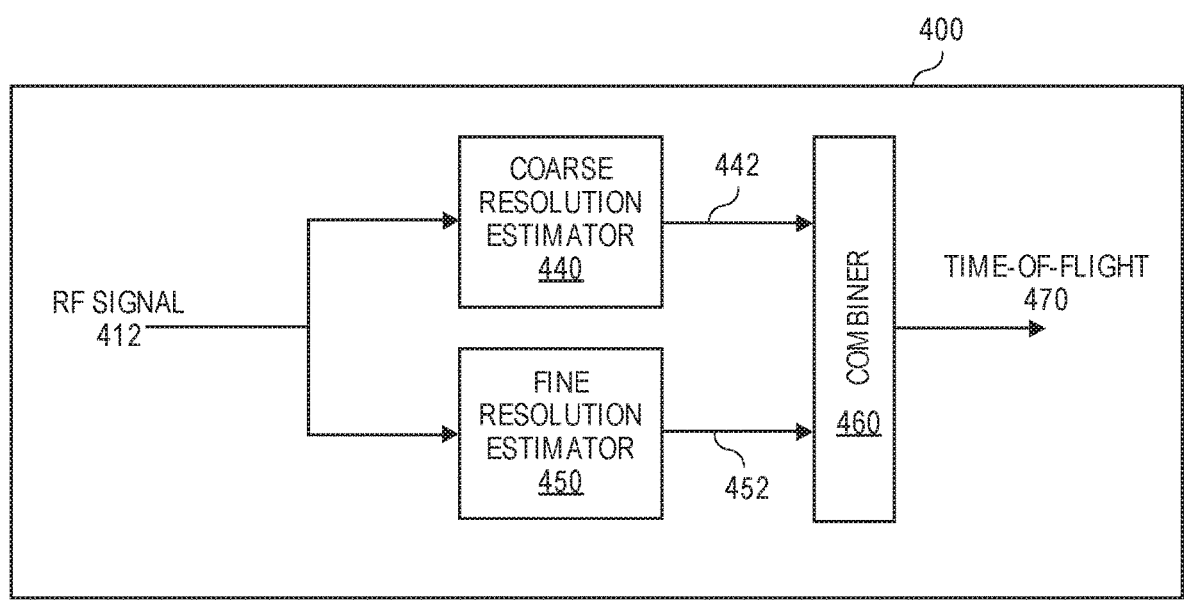
FIG. 6 illustrates a block diagram of a time of flight measurement system in accordance with one embodiment.

FIG. 6 illustrates a block diagram of a time of flight measurement system in accordance with one embodiment. A receiving device (e.g., device 320) receives the transmission from the transmitting device (e.g., device 310) and processes the RF signal 412 to generate at least one coarse estimation 442 using a coarse resolution estimator 440 and at least one fine estimation 452 of the propagation delay between the two devices over the air using a fine resolution estimator 450. These estimators may be implemented in software or hardware. The system 400 then utilizes a combiner 460 to combine the coarse time estimation 442 and the fine time estimation 452 to generate an accurate time-of-flight measurement 470. Again, this combination may be performed in software or hardware. This time-of-flight measurement 470 can then be multiplied by the speed of propagation to calculate the distance, as shown in FIG. 6. In one example, this measurement only works if the receiving device and the transmitting device are synchronized.

In a time of arrival system, the time it takes for a signal to propagate from a transmitter to a receiver must be measured. This measured time can then be converted to a distance estimate by multiplying by the speed of propagation. To estimate the transit time of the signal from the transmitter to the receiver, the "starter gun" and the "finish line" clocks must typically be synchronized such that the actual transit time can be estimated. Any error in synchronization results in an error in time and distance estimation. In a realistic indoor location system, this is not feasible since location estimation will then only work in captive members of a carefully timed network.

In one embodiment of this invention, round-trip signals are used with appropriate time stamping, as disclosed in U.S. Pat. No. 9,763,054 and U.S. application Ser. No. 15/173, 531, which are incorporated by reference herein. Specifically, a signal 612 can be time stamped with the "start time" T1 in FIG. 7 by the device 610 (transmitter), received by the device 620 (e.g., receiver) at time T2 in FIG. 7 and turned around and sent back as a signal 622 to the device 610

Figure 7:
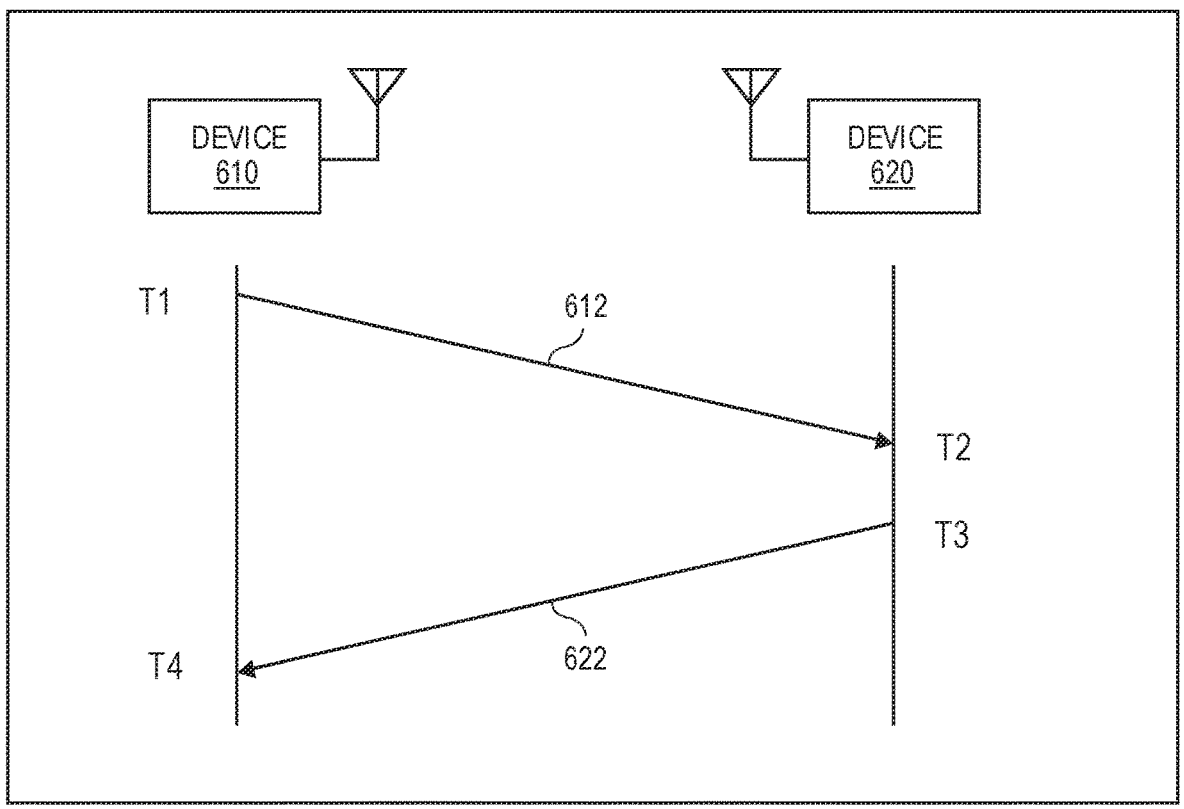
FIG. 7 illustrates an asynchronous system that is used for time of flight estimation in accordance with another embodiment.

(original transmitter) with a "turnaround time" T3 in FIG. 7. The original transmitter now receives the return signal 622 and stamps it with a "finish time" T4 in FIG. 7. Since the signals 612 and 622 went back and forth, the actual transit time in one direction, which can be used for distance estimation, is therefore simply half of a total time (i.e., finish time–start time) less the turnaround time. In one example, the actual transit time in one direction equals 0.5*(T4−T3+T2−T1).

To provide improved accuracy, internal delays in the transmitter and receiver signal paths that cause offsets between the stamped times and the actual transmission and reception times can be measured, estimated, or calculated, and can be used as a correction factor in the measured time of flight. In one embodiment, the internal delays can be measured using loop-back measurements performed in the one or more RF-enabled devices. In another embodiment, the internal delays can be measured using calibration measurements between pairs of RF-enabled devices, for example during manufacturing or testing. The measured values may then be tabulated and stored for correction. The correction factors may be stored locally in a RF-enabled device, or may be stored in some external device.

The accuracy of time and distance determination is limited by the time resolution of the sampling clock. Distance estimation accuracy can be increased, therefore, by increasing the sampling clock frequency. However, such changes necessitate changes in hardware that can add to overall implementation cost, and further, can increase power consumption, etc. Therefore, it is desirable to achieve finer time resolution than is achievable purely through time domain clock sampling. Various methods of achieving this have been described in Ser. No. 15/173,531.

In one embodiment, by using frequency domain techniques, it is possible to build a model for the received signal and use this model to extract delays with finer resolution than achievable via the sampling clock. This is possible provided that the appropriate channel state information (CSI) is made available, which is possible for example, in Wi-Fi, LTE, or 5G, since CSI is routinely collected as part of the overall OFDM or SC-FDMA implementation.

Figure 8A:
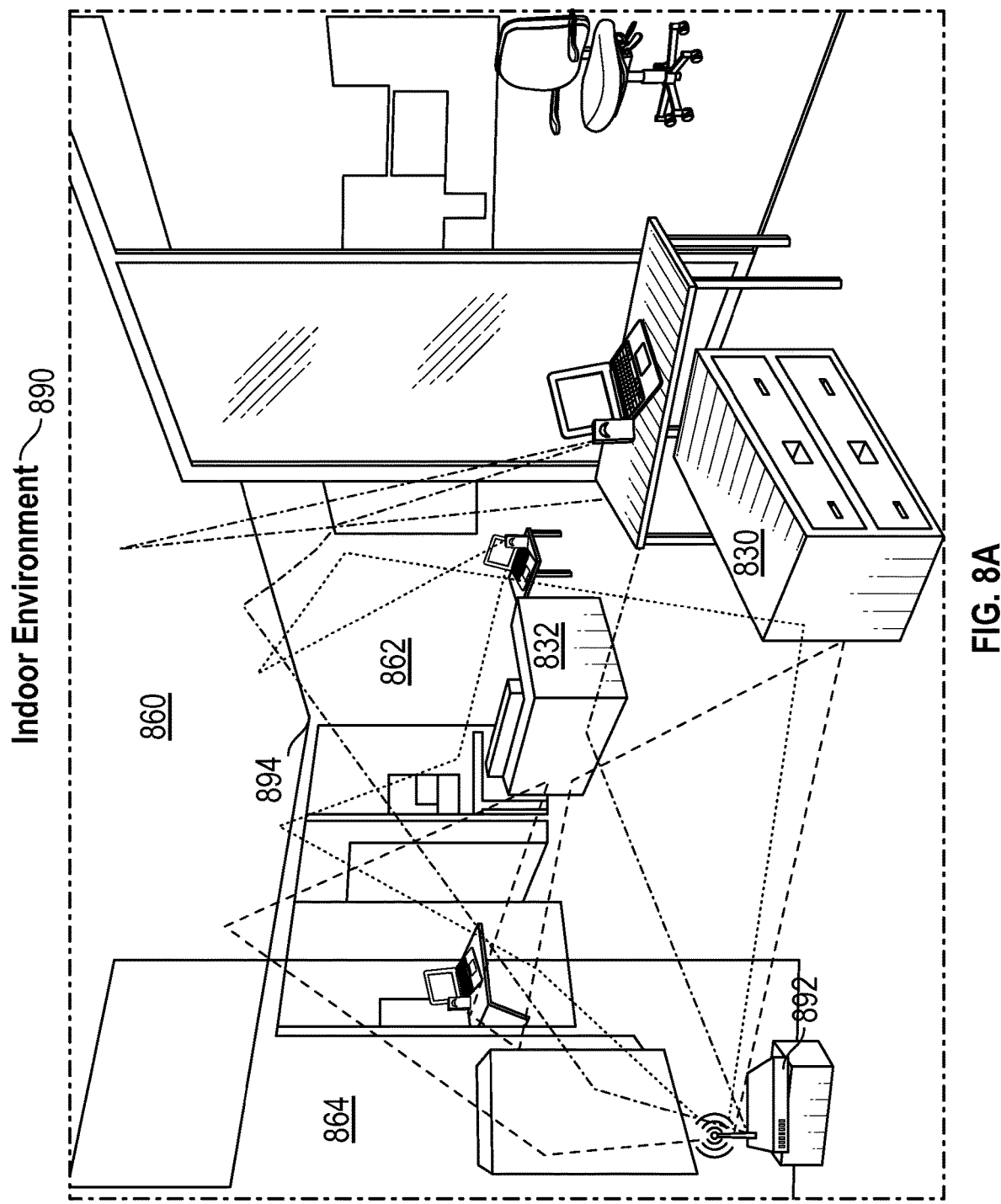
FIG. 8A illustrates numerous reflections off walls 882, 884, ceiling 880, and furniture 830, 832 of an indoor environment 890 that can impact the signals sent from an access point to various Wi-Fi-enabled devices in accordance with one embodiment.

One of the biggest challenges in implementing indoor location services is associated with dealing with multipath. In typical indoor environments, the direct line of sight path is not the only path via which information is transmitted from the transmitter to the receiver. For example, in FIG. 8A, note the numerous reflections off walls 882, 884, ceiling 880, and furniture 830, 832 of the indoor environment 890 that can impact the signals sent from an access point to various Wi-Fi-enabled devices.

Figure 8B:
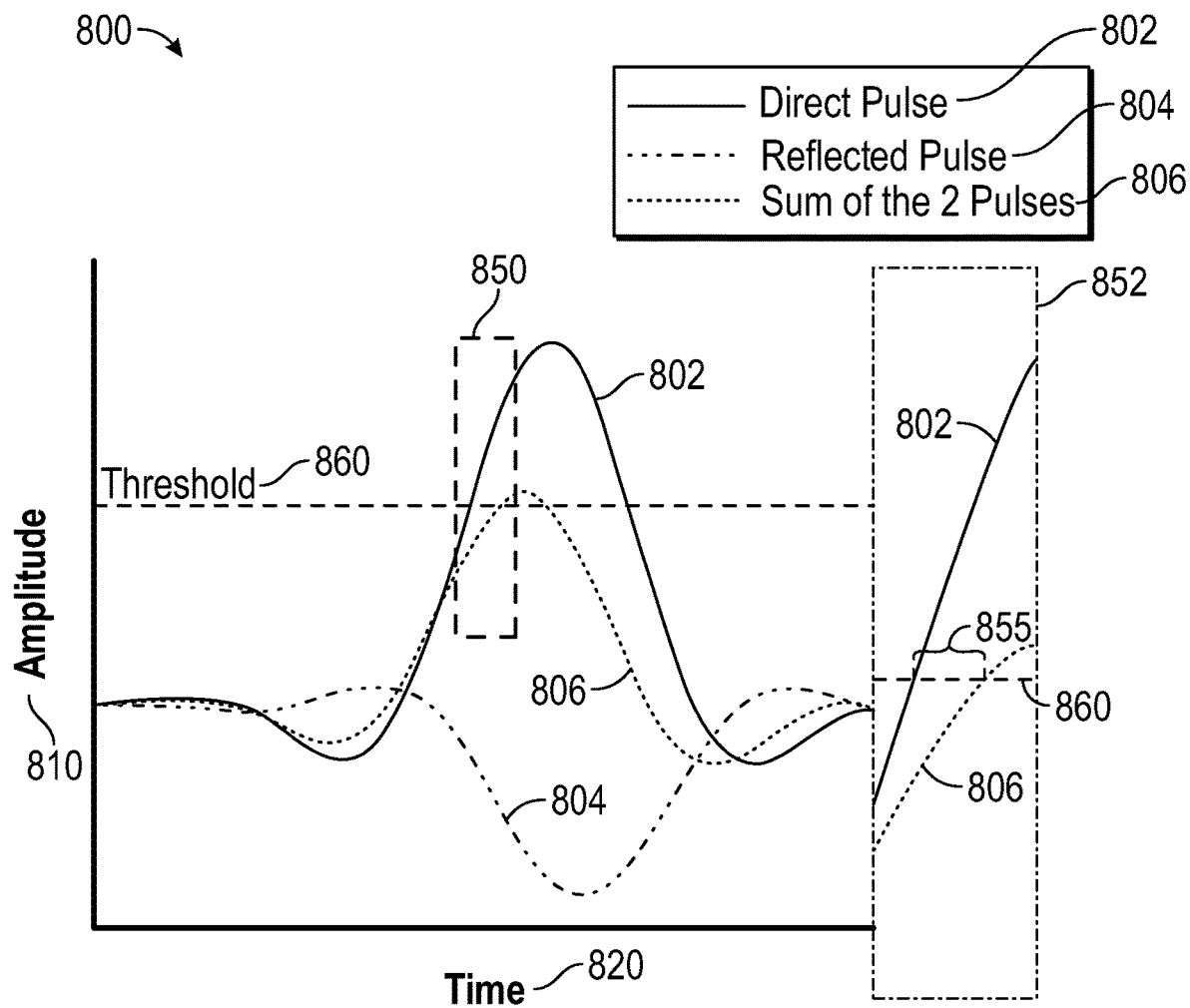
FIG. 8B illustrates summing of direct and reflected signals in accordance with one embodiment.

In some cases, the receiver will use a delayed path (associated with one or more reflections) as the beginning of the reception indication. This might, for example, happen if the amplitude of the delayed path is significantly stronger than the line of sight path. This in turn will lead to late arrival time and erroneous distance estimation. Similarly, the summing of a direct and reflected signal can result in a shift (i.e., delay) where the net signal amplitude crosses the detection threshold for reception, again resulting in erroneous TOA. FIG. 8B illustrates summing of direct and reflected signals in accordance with one embodiment. A signal diagram 800 plots amplitude 810 on a vertical axis and time 820 on a horizontal axis. A direct pulse signal 802 and reflected pulse signal 804 are combined to form a summed signal 806 that has an effective phase shift 855 (i.e., delay) at a threshold 860 as seen in an exploded view 852 of a time window 850.

Techniques to deal with this issue have been discussed in Ser. No. 15/173,531. In one embodiment, CSI data is used to build a model of the transmission channel allowing for the presence of multiple paths, each with associated amplitudes and delays. By performing fitting of the CSI data to the model, the shortest viable path is identified, thus dramatically suppressing multipath-induced errors and outliers.

In a typical indoor environment, there will often be situations where no line of sight path exists at all, and then, even through the use of CSI data as above, erroneous distance estimation results. This can then result in significant outliers. This situation can be resolved through the use of triangulation in which multiple excess anchors are used. In this case, even if some of the distance measurements are erroneous, the error can be minimized or eliminated through techniques such as least-squares, etc., applied during triangulation. Techniques and methods for choosing and eliminating anchors are disclosed in Ser. No. 15/684,891, which is incorporated by reference herein.

In one example, the key to accurate TOA is accurate timing determination. In one embodiment, this is achieved using CSI-based frequency domain techniques, with several improvements to achieve accuracy in realistic multipath environments.

Figure 9B:
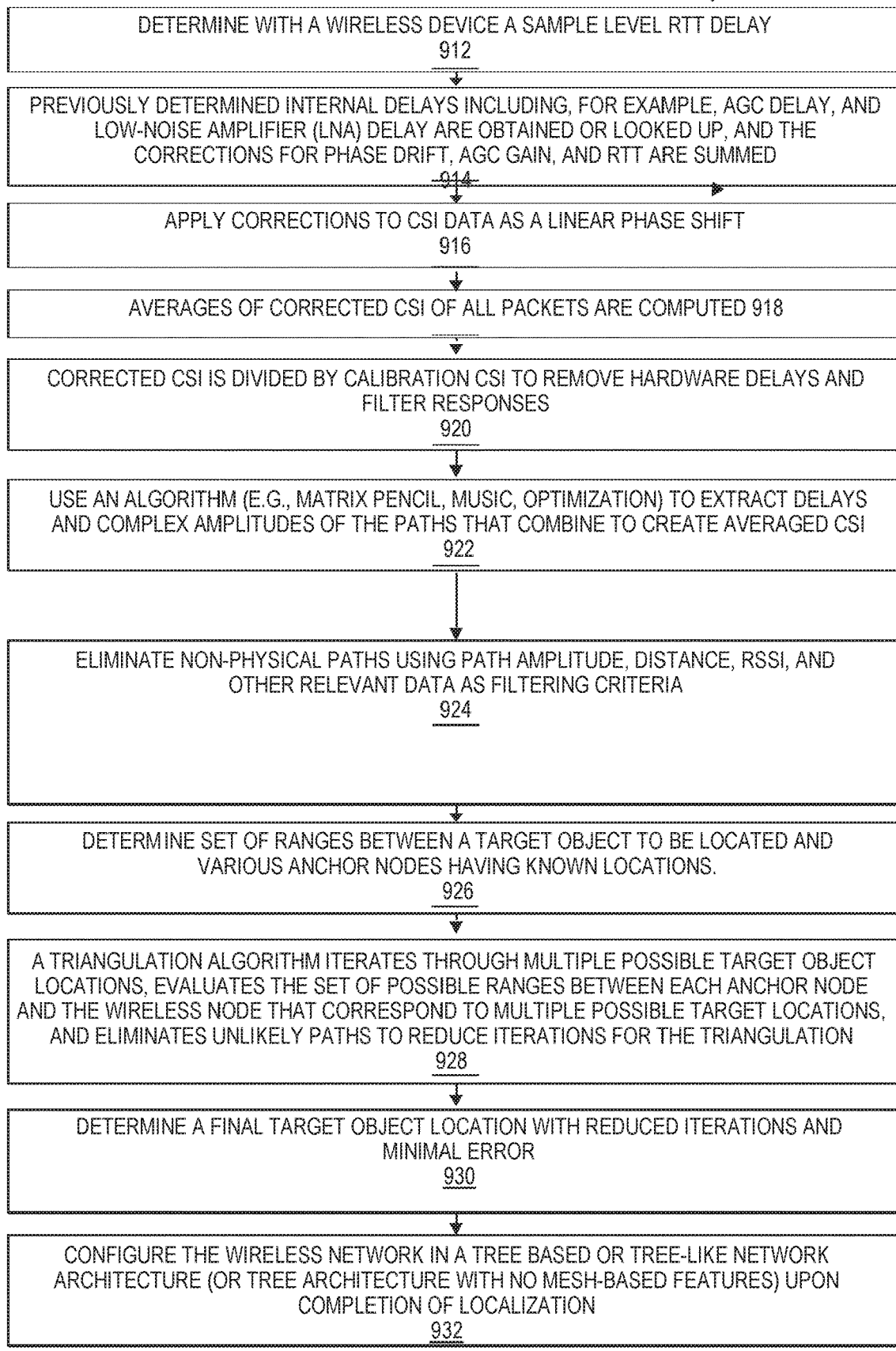

FIGS. 9A-9B illustrate a method for localization of wireless devices that utilizes accurate timing determination of TOA within a wireless sensor network in accordance with one embodiment. The operations of this method may be executed by a wireless device, a wireless control device of a hub (e.g., an apparatus), a system, or a remote device, computer, or cloud service which includes processing circuitry or processing logic. The processing logic may include hardware (circuitry, dedicated logic, etc.), software (such as is run on a general purpose computer system or a dedicated machine or a device), or a combination of both. In one embodiment, an anchor node, a hub, a wireless device, or a remote device, computer, or cloud service performs the operations of this method. Algorithms associated with the various computations may be performed in a remote computer to which the relevant data associated with timing and distance measurements is sent. The remote device or computer may be at a different location (e.g., different network, in the cloud) than the wireless network architecture having a plurality of wireless nodes. The remote device or computer may be at a different location within the wireless network architecture than certain nodes that are transmitted and receiving communications within the wireless network architecture.

Upon initialization of a wireless network architecture, at operation 901, the processing logic calibrates at least one component (e.g., automatic gain control (AGC) stage of the RF circuitry, filter stage of the RF circuitry, etc.) that has a delay. The calibration of at least one component may include measuring a delay of at least one component (e.g., AGC stage as a function of gain, filter stage), determining if a deviation exists between the measured delay and a baseline delay of at least one component that is determined by this calibration, and correcting a timing of the determined time of flight estimate if a deviation exists. The calibration typically occurs during the initialization of the wireless network architecture. Alternatively, the calibration may occur at a later time of the method 900. In yet another alternative, the calibration could have been previously performed during manufacturing or testing.

At operation 902, the hub (or anchor node, wireless device, remote device or computer) having radio frequency (RF) circuitry and at least one antenna transmits communications to a plurality of sensor nodes in the wireless network architecture (e.g., wireless asymmetric network architecture). At operation 903, the RF circuitry and at least one antenna of the hub (or anchor node, wireless device, remote device or computer) receives communications from the plurality of sensor nodes each having a wireless device with a transmitter and a receiver to enable bi-directional communications with the RF circuitry of the hub in the wireless network architecture. At operation 905, processing logic of a hub (or anchor node, wireless device, remote device or computer) having a wireless control device initially causes a wireless network of sensor nodes to be configured as a mesh-based network architecture for a time period (e.g., predetermined time period, time period sufficient for localization, etc.) for localization of at least one wireless device (wireless node).

At operation 906, the wireless devices obtain CSI data from the RF signals transmitted and received between wireless devices (e.g., signals 612 and 622). The time of transmission and arrival of the signals will typically be recorded. Automatic gain control (AGC) delays are removed to correct a coarse time of flight estimate of a first packet sent with a first RF signal from a first wireless device to a second wireless device and a second packet sent with a second RF signal from the second wireless device to the first wireless device. This is done for both forward and reverse directions. Filter delays are also removed based on the RC calibration.

In one example, the first wireless device transmits the first RF signal to the second wireless device, which measures first channel state information having channel frequency response measurements of the first RF signal. The first wireless device measures second channel state information having channel frequency response measurements of the second RF signal that is transmitted from the second wireless device to the first wireless device.

At operation 908, the edges of the frequency spectrum, namely the highest and lowest subcarriers of the RF signals may be removed or discarded. These highest and lowest subcarriers of the RF signals typically carry no data or show significant signal degradation due to filter roll-off which introduces errors into the method. Due to interference, etc., the significant filter roll-off is common for real communications to result in subcarriers without data or reliable CSI measurements. In this case, at operation 920, the corrected CSI may be divided by a calibration CSI to remove hardware delays and filter responses.

In one example, the calibration CSI is determined based on using a pair of nodes, determining point to point transmit and receive measurements for short distances with a cable that connects the pair of nodes to each other. In this manner, the calibration determines internal delays of hardware components of each node using a cable.

In another example, a loopback test is performed upon initialization of a wireless sensor network in an indoor environment or for an individual node in a manufacturing environment. Each node has the ability to loop back from its transmit path to its receive path for the same node to correct for frequency and amplitude issues of internal delays and filter responses of the nodes. In this manner, the calibration performs loopback by transmitting and receiving RF signals for an individual node. The loopback is described in more detail in conjunction with the description of FIG. 12.

At operation 922, an algorithm (e.g., Matrix pencil, MUSIC, optimization techniques) is then used to extract the delays and complex amplitudes of the paths that combine to create the averaged CSI.

At operation 924, non-physical paths may be eliminated using path amplitude, distance, RSSI, and other relevant data as filtering criteria. The shortest remaining path is assumed to be a line of sight path. Note that information on other paths may also be shared with a triangulation algorithm to improve overall accuracy. At operation 926, a set of ranges are determined between a target object to be located and various anchor nodes having known locations. At operation 928, the calculation of the target object location via a triangulation algorithm occurs. A subset of anchor nodes can be selected for localization using triangulation when an error metric that is associated with each distance estimate between an anchor node having a known location and a wireless sensor node having an unknown location is less than or equal to an error threshold. At least one anchor node is eliminated for localization when the error metric is greater than or equal to the error threshold.

In one example, at operation 926, a ranging algorithm, performed for "A" selected anchors, each with a pre-specified location, produces multiple "A" ranging results "r".

In one embodiment, at operation 928 a triangulation algorithm iterates through multiple possible target object locations (x,y), evaluates the set of possible ranges between each anchor node and the wireless node that correspond to multiple possible target object locations, and eliminates unlikely paths to reduce iterations for the triangulation and also minimize the overall error. In another example, for a linearized least squares or other similar method, the location could be directly solved without iteration. The linearized least squares or other similar method is typically less accurate due to the linearization, but faster compared to iterations. At operation 930, a final target objection location with reduced iterations and minimal error is then determined. At operation 932, the processing logic of the hub (or anchor node, wireless device, remote device or computer) configures the wireless network in a tree based or tree-like network architecture (or tree architecture with no mesh-based features) upon completion of localization. In one example, the hub and sensor nodes have similar RF components that are capable of switching between the mesh and tree architectures.

In another example, the hub and sensors nodes each have multiple radios that are capable of operating mesh and tree architectures simultaneously. In this case, the tree network is always or normally available and the mesh network can be enabled or disabled.

In typical triangulation based localization scheme, the target location is estimated based on minimizing the mean square error of the distance estimation from available reference nodes. However, the probability distribution of the measurement error is not considered in the minimization problem, which can limit accuracy of the triangulation. The measurement error of different signal features can have different probability distributions. In addition, the variance of the measurement error can become large in complex signal propagation environment as discussed above. As a result, minimizing the mean square error of distance measurement without considering the error probability model may not give an optimum target location estimation result. Therefore, in one embodiment, a method for Maximum Likelihood Estimation (MLE) is used to improve the accuracy of triangulation as illustrated in FIG. 10. Other estimators may also be used. The operations of this method may be executed by a wireless device, a wireless control device of a hub (e.g., an apparatus), a system, or a remote device or computer which includes processing circuitry or processing logic. The processing logic may include hardware (circuitry, dedicated logic, etc.), software (such as is run on a general purpose computer system or a dedicated machine or a device), or a combination of both. In one embodiment, an anchor node, a hub, a wireless device, or a remote device or computer performs the operations of this method. Algorithms associated with the various computations may be performed in a remote computer to which the relevant data associated with timing and distance measurements is sent. The remote device or computer may be at a different location (e.g., different network, in the cloud) than the wireless network architecture having a plurality of wireless nodes. The remote device or computer may be at a different location within the wireless network architecture than certain nodes that are transmitted and receiving communications within the wireless network architecture.

The method transmits, with a plurality of wireless anchor nodes each having a known location, communications to a wireless node. The anchor nodes receive communications from the wireless node. At operation, 1004, the method determines a set of possible ranges between each anchor node and the wireless node having an unknown location. At operation 1006, the method adds weighted range distributions together if multiple range values occur per anchor node.

In one embodiment, the unknown parameters in a statistical model are estimated through maximizing the joint probability of having a set of independent and identically distributed observed data in accordance with the following operations:

If ri is the range measurement from anchor I, and theta is position hypothesis, then the conditional probability of seeing range measurement ri from anchor i given position hypothesis theta is given by a probability distribution p (ri|theta). Given a range distribution from each anchor, the likelihood of a range and position hypothesis may be computed at operation 1008 as the product of all these from the different range measurements:

$$\mathcal{L}(r \mid \theta) = \prod_{i=1}^{k} p(r_i \mid \theta)$$

The triangulation is optimized by maximizing this likelihood. In one embodiment, the product in the above form may be converted to a sum by using a logarithm at operation 1010. At operation 1012, the method performs a triangulation algorithm that utilizes a maximum likelihood estimation (MLE) by selecting a hypothesis (e.g., position hypothesis for the wireless node having the unknown location) with a highest probability.

One example of a logarithm at operation 1010 follows below.

$$\log \mathcal{L}(r \mid \theta) = \sum_{i=1}^{k} \log\{p(r_i \mid \theta)\}$$

In one embodiment, the equation may be negated to define the problem as a minimization problem rather than a maximization problem.

$$\min_{\theta}\{-\log \mathcal{L}(r \mid \theta)\} = \min_{\theta}\left\{-\sum_{i=1}^{k} \log\{p(r_i \mid \theta)\}\right\}$$

This has the advantage of being numerically stable and computable given a parametrized form for p(ri|theta). If a single range value is passed from the ranging algorithm to each anchor, and the ranging error is normal distributed, the maximum likelihood estimation may be determined as follows:

$$p(r_i \mid \theta) = \frac{1}{\sqrt{2\pi\sigma_i^2}} e^{\frac{-(d(a_i,\theta)-r_i)^2}{2\sigma_i^2}}$$

Where r and theta are as previously defined, and $\sigma_i$ is the uncertainty in the range measurement from the node in question to anchor i as determined in the ranging measurement, and $d(\sigma_i, \text{theta})$ is the distance from anchor i, $\sigma_i$ to the current position hypothesis. If the uncertainties are the same from all anchors then the MLE methodology gives:

$$\min_{\theta}\{-\log \mathcal{L}(r \mid \theta)\} = \min_{\theta}\left\{\sum_{i} (d(a_i, \theta) - r_i)^2\right\}$$

Which is the same as a typical least squares triangulation methodology. On the other hand, if some anchors were more trustworthy than others, as will often be the case in a realistic environment, then the MLE methodology gives:

$$\min_{\theta}\{-\log \mathcal{L}(r \mid \theta)\} = \min_{\theta}\left\{\sum_{i} (d(a_i, \theta) - r_i)^2 / \sigma_i^2\right\}$$

This has the benefit of reducing the importance of high uncertainty (i.e., with high values of σ) measurements on the overall triangulation estimation. This is beneficial versus standard least squares, since highly uncertain ranging measurements will be effectively weighted less than more certain measurements in determining the final location via triangulation. As mentioned above, it is possible for the ranging algorithm to provide more than one range per anchor. In one embodiment, this may be modeled as a multivariate Gaussian (GM) distribution with two components:

$$p(r_i \mid \theta) = p_{i0}\left(\frac{1}{\sqrt{2\pi\sigma_{i0}^2}} e^{\frac{-(d(a_i,\theta)-r_{i0})^2}{2\sigma_{i0}^2}}\right) + p_{i1}\left(\frac{1}{\sqrt{2\pi\sigma_{i1}^2}} e^{\frac{-(d(a_i,\theta)-r_{i1})^2}{2\sigma_{i1}^2}}\right)$$

Where $p_{ij}$ is the probability of that range hypothesis, i.e., how much each range estimate from anchor i and path j is trusted versus the other one. In this example d(ai,theta) can be either direct distance from anchor i to the current position hypothesis theta or one of them could be distance through known reflector like ground, floor, wall, ceiling etc. Note that since two values have been provided in this embodiment, the sum will still be 1. In one example, $r_{ij}$ is the relevant range; in the case where there are two ranges per anchor, this will take the form $r_{i0}$ and $r_{i1}$ and similarly for sigma. In this case, the MLE method gives:

$$\min_\theta \{-\log \mathcal{L}(r \mid \theta)\} = \min_\theta \left\{ -\sum_{i=1}^{k} \log\{GM(r_{i0}, r_{i1} \mid \theta)\} \right\}$$

These example embodiments used two ranging paths and normal distributed ranging error. In practice there can be any number of paths and the error distribution can be of any form. For the most accurate location estimate the actual statistics of the path probability and ranging error distribution can be used. In that case the most likely location for K anchors with $N_i$ range paths for anchor i is $$\max_\theta \left\{ \prod_{i=1}^{K} \sum_{j=1}^{N_i} k_{ij} \cdot e^{-(d(a_i,\theta) - r_{ij})^n / \sigma_{ij}} \right\}$$

where k, n and a are parameters describing the path and error statistics. The actual implementation can again use numerically more efficient but otherwise identical form of $$\min_\theta \left\{ -\sum_{i=1}^{K} \log \left( \sum_{j=1}^{N_i} k_{ij} \cdot e^{-(d(a_i,\theta) - r_{ij})^n / \sigma_{ij}} \right) \right\}$$

The solution for any of these problems may be determined using an iterative method at operation 1012 as would be apparent to one of ordinary skill in the art. This may be a brute force approach involving iterative across the entire search space, or may involve use of techniques such as Kalman Filtering, optimization methods, or similar techniques as would be known to one of skill to improve the efficiency of iteration.

Figure 19:
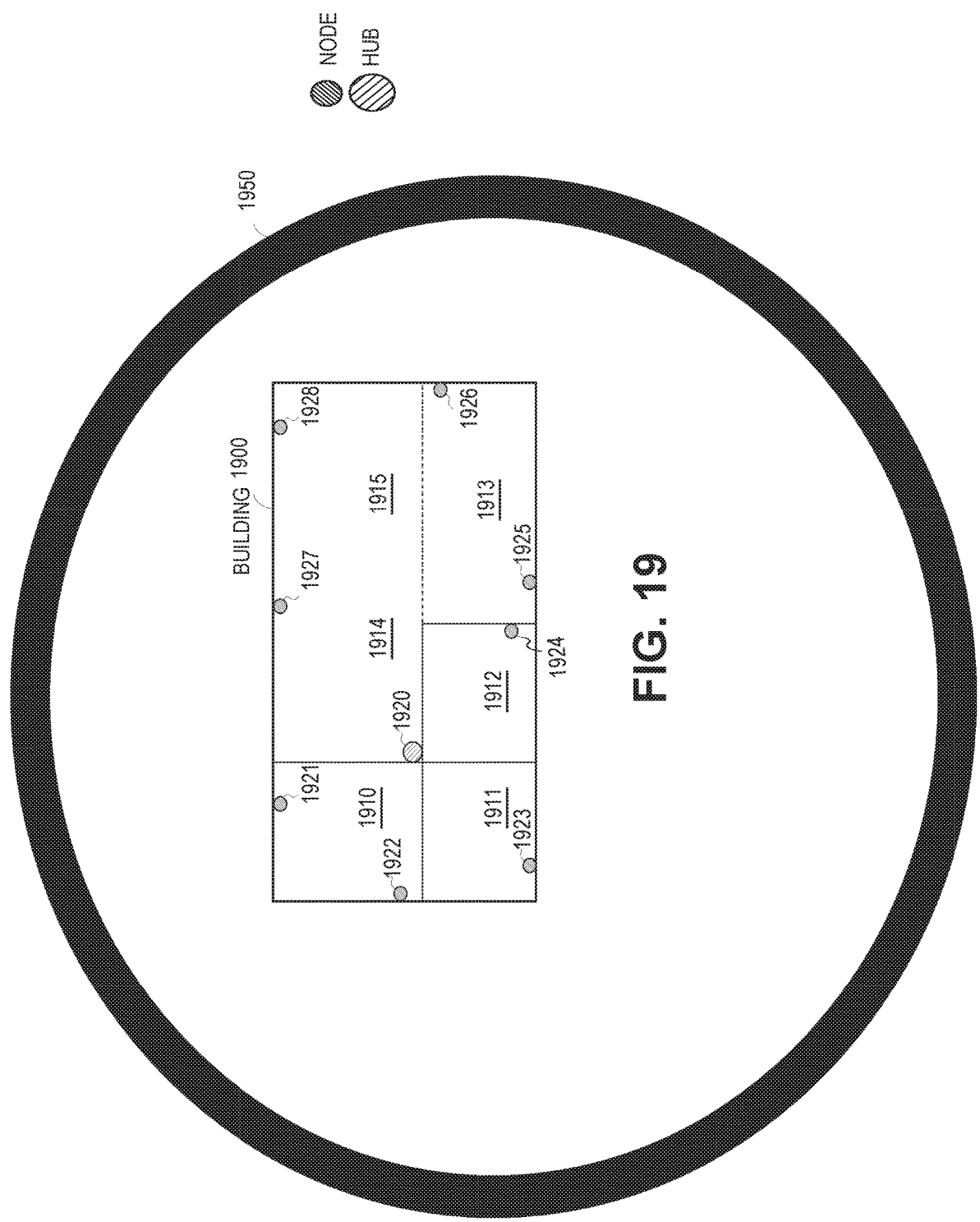
FIG. 19 illustrates an exemplary building 1900 (e.g., house, industrial environment) with nodes spread out in various rooms and a centrally located hub having a predefined search space in accordance with one embodiment.

The range of values over which iteration may be performed may be determined in various ways. In a first embodiment as illustrated in FIG. 19, a full search of possible values over a pre-defined search space may be performed. FIG. 19 illustrates an exemplary building 1900 (e.g., house, industrial environment) with nodes spread out in various rooms and a centrally located hub in accordance with one embodiment. In one example, a location of the nodes is known via predefined user input or automatic localization by the nodes themselves. Systems and methods of localization are disclosed in application Ser. No. 14/830,668, which is incorporated by reference. In this example, the nodes 1921-1928 can be communicating with the hub 1920 and amongst each other in the different rooms including rooms 1921-1923 (e.g., bedroom, office, storage, etc.), an area 1913, a common area 1914, and a room 1915 (e.g., living room, open area).

The bounds of the search space may be set, for example, by the maximum range of transmission of the system or some multiple or fraction thereof. For example, Wi-Fi systems often deliver a maximum indoor range of several tens of meters. This may then be used to define a maximum search space boundary 1950 of tens to hundreds of meters, depending on the range, the number of nodes in the network, etc.

Figure 20:
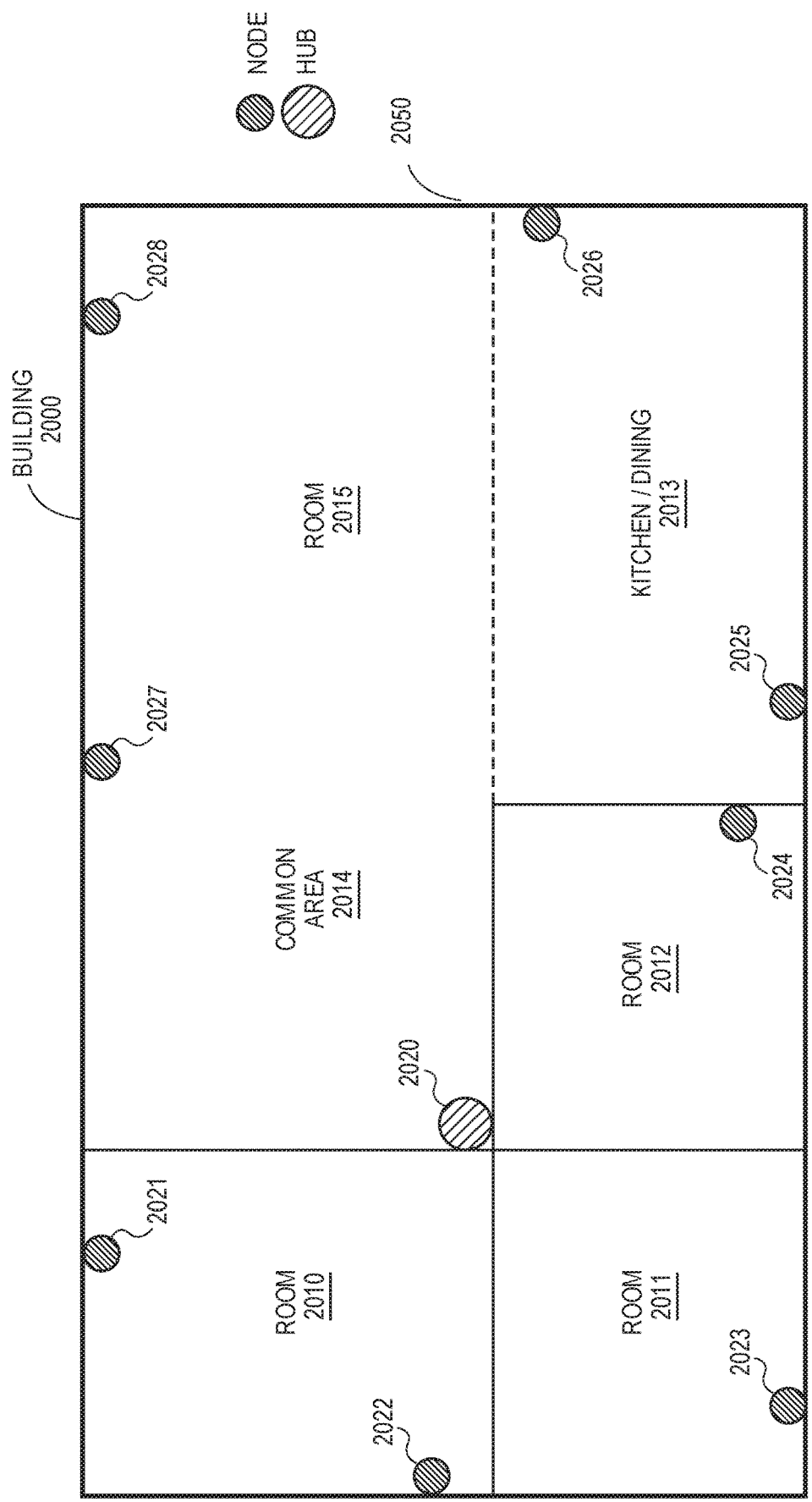
FIG. 20 illustrates an exemplary building 2000 (e.g., house, industrial environment) with nodes spread out in various rooms and a centrally located hub having a search space that is bounded by exterior walls of the building in accordance with one embodiment.

In another embodiment as illustrated in FIG. 20, the bounds of the search space 2050 may be defined by the physical dimensions of the environment in which the localization system is deployed. For example, any values outside the walls of the property may be assumed to be impossible outcomes and therefore may be excluded from the search space. In this example, the nodes 2021-2028 can be communicating with the hub 2020 and amongst each other in the different rooms including rooms 2021-2023 (e.g., bedroom, office, storage, etc.), an area 2013, a common area 2014, and a room 2015 (e.g., living room, open area).

Figure 21:
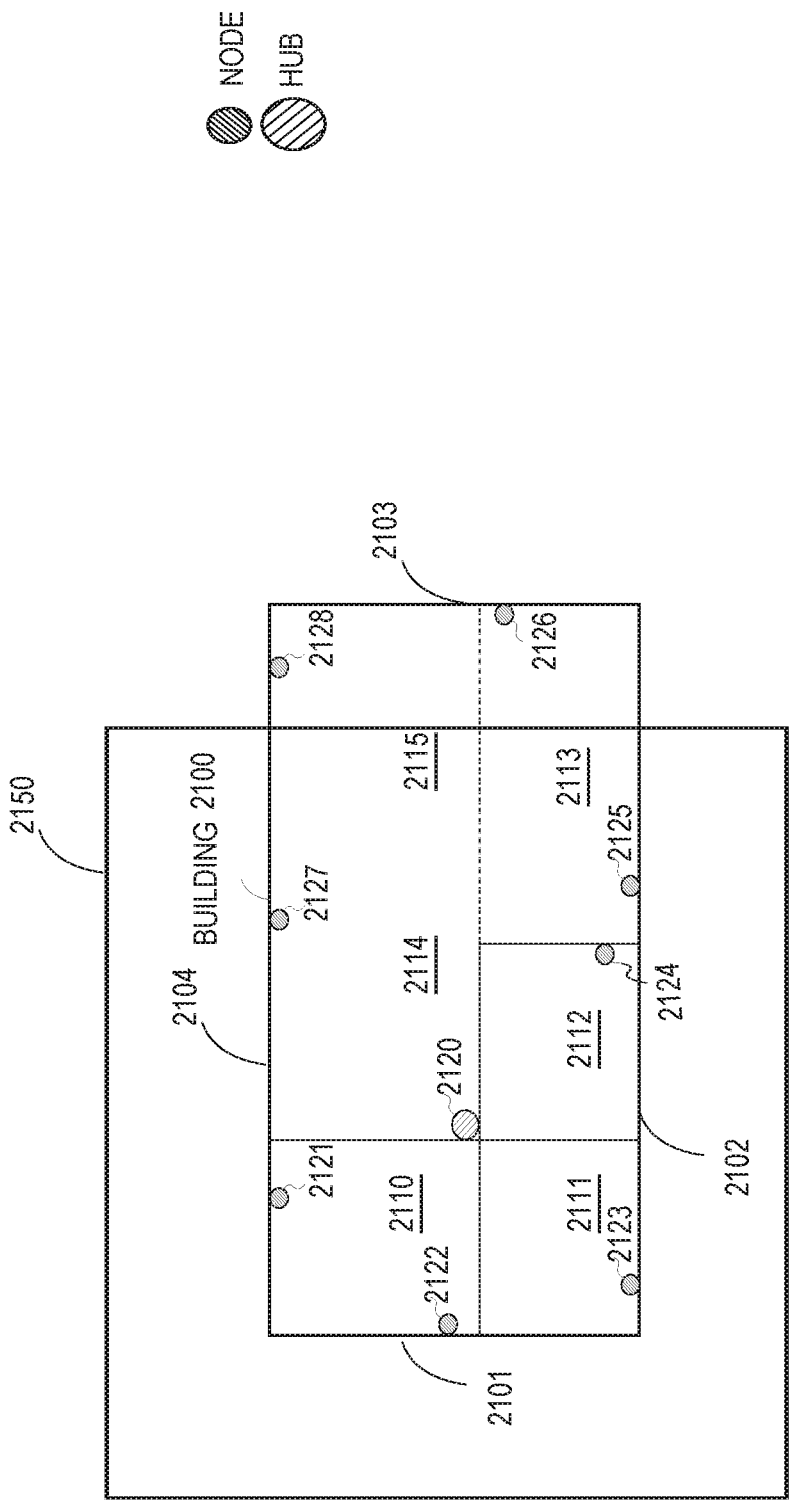
FIG. 21 illustrates an exemplary building 2100 (e.g., house, industrial environment) with nodes spread out in various rooms and a centrally located hub having a search space that is bounded partially by one wall and extends beyond the other 3 walls of the building in accordance with one embodiment.

In another embodiment as illustrated in FIG. 21, the bounds of the search space may be defined by the locations of the specific set of anchor nodes that a wireless node communicates with during a location operation. The search space 2150 can extend by the range of transmission of the anchors nodes used or can be set using a combination of the anchor transmission range and known physical bounds of the space. The building includes walls 2101-2104. In one example, a user tries to locate node 2122 that is only able to range with 2121, 2123, 2120, 2124, and 2127. In this case, the search space 2150 may extend just beyond 2124 and 2127 on the right side of the example floorplan (but not all the way to nodes 2128 and 2126). Even if numerous anchor nodes are included in the system, if a node doesn't range with all of the anchor nodes, then the search space can be limited to the subset of anchor nodes and the area around these anchors that the node of unknown location is able to perform ranging.

In this example, the nodes 2121-2128 can be communicating with the hub 2120 and amongst each other in the different rooms including rooms 2121-2123 (e.g., bedroom, office, storage, etc.), an area 2113, a common area 2114, and a room 2115 (e.g., living room, open area).

Figure 11:
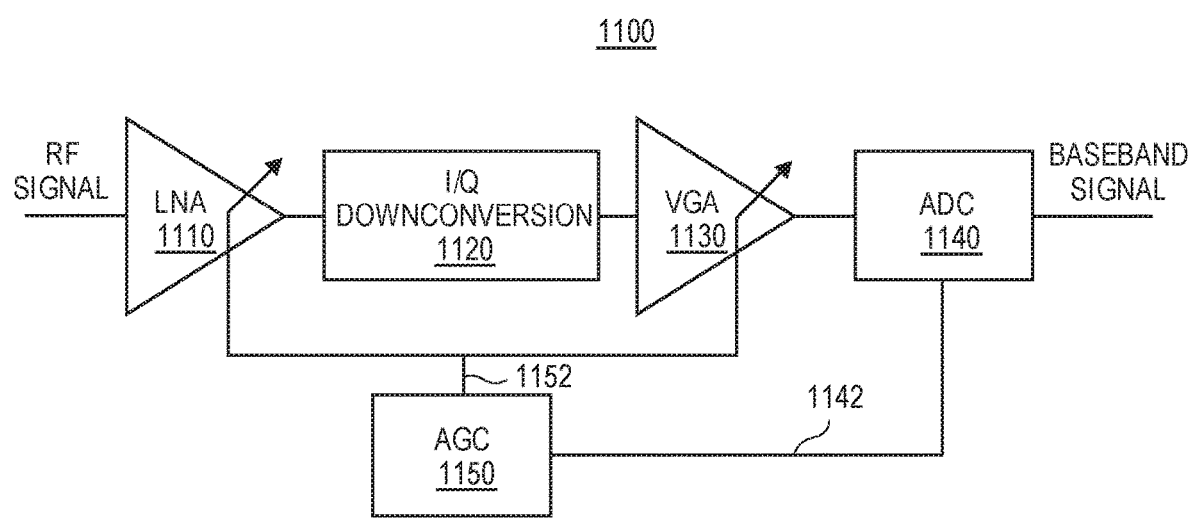
FIG. 11 illustrates a calibration system having automatic gain control in accordance with one embodiment.

As is apparent from the above embodiments, measurement of timing is critical to establishment of distance estimation. Errors in timing can reduce accuracy of distance estimation. Timing errors often exist within wireless systems. For example, automatic gain control (AGC) is commonly used to ensure robust receiver operation for signals of varying signal strength. During operation, AGC stages may have delays that vary based on the gain. As such, these variations in delay can add to the uncertainty of TOF estimation. In one embodiment, this error can be minimized through calibration. The delay as a function of AGC stage gain may be pre-measured and used to correct the timing during the actual TOF measurement, by subtracting such deviations from the baseline delay. FIG. 11 illustrates RF circuitry having automatic gain control in accordance with one embodiment. The RF circuitry 1100 (e.g., 1550, 1670, 1692, 1770, 1870, etc.) can be included in any wireless node (e.g., hub, sensor node) as described in embodiments of the present disclosure. The RF circuitry 1100 includes a low noise amplifier 1110 to receive a RF signal and to generate an amplified signal sent to an in-phase quadrature (I/Q) downconversion unit 1120 to downconvert RF signals to a desired intermediate frequency. A variable gain amplifier 1130 amplifiers the intermediate frequency signal and then an analog to digital converter (ADC) converts the amplified signal into a baseband signal. The AGC 1150 is a closed-loop feedback regulating circuit that provides a controlled signal amplitude at its output 1152 despite variation of the amplitude in its input 1142. As discussed above, the delay as a function of AGC stage gain (e.g., AGC 1150) may be pre-measured and used to correct the timing during the actual TOF measurement, by subtracting such deviations from a baseline pre-measured delay. Similarly, other calibrated system configurations such as filter delay may be pre-measured and deducted as well.

Figure 12:
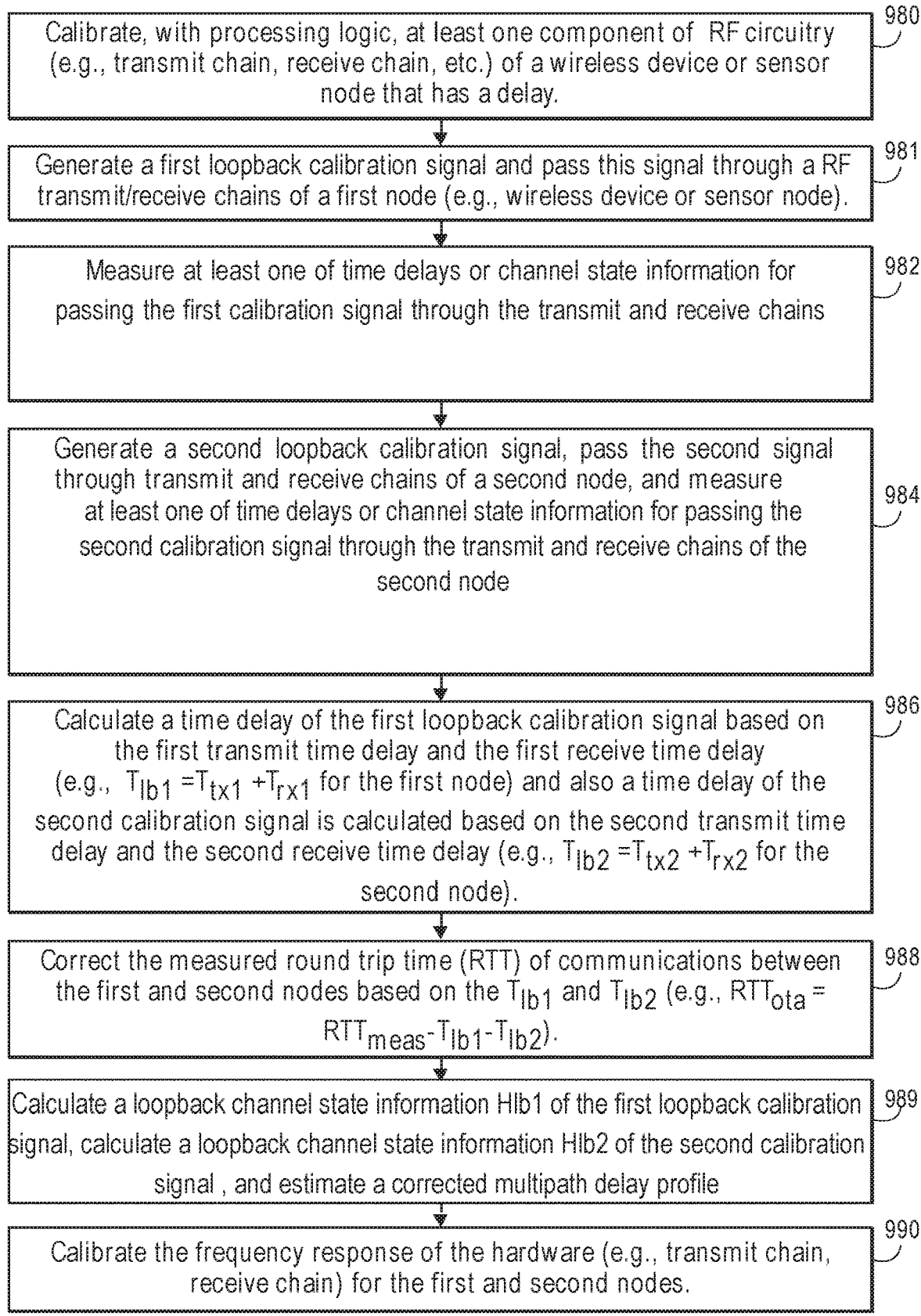
FIG. 12 illustrates a method for removing hardware delays and non-idealities using a loopback calibration in accordance with one embodiment.

FIG. 12 illustrates a method for removing hardware delays and non-idealities using a loopback calibration in accordance with one embodiment. The operations of this method may be executed by a wireless device, a wireless control device of a hub (e.g., an apparatus), a system, or a remote device or computer which includes processing circuitry or processing logic. The processing logic may include hardware (circuitry, dedicated logic, etc.), software (such as is run on a general purpose computer system or a dedicated machine or a device), or a combination of both. In one embodiment, an anchor node, a hub, a wireless device, or a remote device or computer performs the operations of this method. Algorithms associated with the various computations may be performed in a remote computer to which the relevant data associated with distance measurements is sent. The remote device or computer may be at a different location (e.g., different network, in the cloud) than the wireless network architecture having a plurality of wireless nodes. The remote device or computer may be at a different location within the wireless network architecture than certain nodes that are transmitted and receiving communications within the wireless network architecture.

During a manufacturing process of components of a wireless network architecture or upon initialization of the wireless network architecture, at operation 980, the processing logic calibrates at least one component of RF circuitry (e.g., transmit chain, receive chain, etc.) of a wireless device or sensor node that has a delay. The calibration of at least one component may include generating a first loopback calibration signal and passing this signal through a RF transmit chain of a first node (e.g., wireless device or sensor node) at operation 981. This first loopback calibration signal is not necessarily transmitted over the air. The transmit chain is connected to a receive chain of the wireless device or sensor node explicitly or through on chip leakage. This connection can be performed at any point in the RF chain. In one example, the RF transmit and receive chains are set to be active simultaneously. The blocks of the RF transmit chain that the first loopback calibration signal travels through before looping back through the RF receive chain can be characterized and calibrated for later measurements. At operation 982, the processing logic measures at least one of time delays or channel state information for passing the first calibration signal through the transmit and receive chains. The processing logic measures time delays only, channel state information only, or both time delays and channel state information. In one example, a first transmit time delay $T_{tx1}$ for passing the first loopback calibration signal through the transmit chain and a first receive time delay $T_{rx1}$ for passing the first loopback calibration signal through the receive chain of the first node (e.g., wireless device, sensor node) is measured. It may not be possible to measure the transmit time delay and receive time delay independently. Thus, in some cases, only the sum can be measured. In another example, a first transmit channel state information and a first receive channel state information for passing the first loopback calibration signal through the transmit chain and through the receive chain of the first wireless node is measured to determine hardware delays of the first wireless node.

At operation 984, the processing logic generates a second loopback calibration signal, passes the second signal through transmit and receive chains of a second node, and measures at least one of time delays or channel state information for passing the second calibration signal through the transmit and receive chains. In one example, a second transmit time delay $T_{tx2}$ for passing the second loopback calibration signal through a transmit chain of a second node and also a second receive time delay $T_{rx2}$ for passing the second loopback calibration signal through the receive chain of the second node (e.g., wireless device, sensor node) is measured. In another example, a second transmit channel state information with a second receive channel state information for passing the second loopback calibration signal through the transmit chain and through the receive chain of the second wireless node is measured to determine hardware delays of the second wireless node.

At operation 986, the processing logic can calculate a time delay of the first loopback calibration signal based on the first transmit time delay and the first receive time delay (e.g., $T_{lb1}=T_{tx1}+T_{rx1}$ for the first node) and also a time delay of the second calibration signal is calculated based on the second transmit time delay and the second receive time delay (e.g., $T_{lb2}=T_{tx2}+T_{rx2}$ for the second node). Then at operation 988 the measured RTT for communications transmitted between the first and second nodes can be corrected based on the $T_{lb1}$ and $T_{lb2}$ (e.g., $RTT_{ota}=RTT_{meas}-T_{lb1}-T_{lb2}$).

At operation 989, the processing logic calculates a loopback channel state information $H_{lb1}$ of the first loopback calibration signal based on the first transmit channel state information $H_{tx1}$ and the first receive channel state information $H_{rx1}$ for the first wireless node, calculates a loopback channel state information $H_{lb2}$ of the second calibration signal calculated based on the second transmit channel state information $H_{tx2}$ and the second receive channel state information $H_{rx2}$ for the second wireless node, and estimates a corrected multipath delay profile over the air that is calculated based on any received over the air data packet channel state information (CSIs) from the first and second wireless nodes and loopback channel state information ($H_{lb1}*H_{lb2}$) from the loopback measurements of the first and the second wireless devices. In one example, the corrected multipath delay profile over the air is calculated based on the product of any received over the air data packet channel state information (CSIs) from the first and second wireless node divided by the product of the loopback channel state information ($H_{lb1}*H_{lb2}$) from the loopback measurements of the first and the second wireless devices.

At operation 990, the processing logic calibrates the frequency response of the hardware (e.g., transmit chain, receive chain) for the first and second nodes. In one example, the loopback calibration can provide $H_{lb1}=H_{tx1}*H_{rx1}$ for the first node and $H_{lb2}=H_{tx2}*H_{rx2}$ for the second node. In the unidirectional case, the loopback calibration from just the receive side, just the transmit side, or some combination of the two (average, etc) can be used. For example, $H_{ota}(f)=H_{meas}(f)/H_{lb2}$. Applying the loopback to the standard unidirectional corrected measurement implicitly assumes that the nodes have equal transmit and receive delays and filter profiles. Full loopback correction requires a slightly different algorithm where the channel is derived from the combination of the two measured CSIs. This requires multiplying the CSIs and taking the square root in such a way that the correct phase is maintained. Full loopback calibration can be found from: $H_{ota}^2(f)=H_{meas1}(f)*H_{meas2}(f)/(H_{lb1}*H_{lb2})$.

The loopback can be done as part of production or factory testing and results stored in memory. Alternatively, the loopback can be performed periodically during normal operation. Performing periodically during normal operation allows changes in hardware delays and non-idealities over time, temperature, etc to be calibrated and corrected automatically. In the production or factory test method, variations over temperature would need to be characterized. An on chip or on-board temperature sensor could be used to adjust the calibration correction depending on the characterized temperature profile.

In one embodiment, the baseband hardware allows full duplex operation. In this case, the signal can be transmitted and then immediately received after going through the transmit and receive chains. The CSI, transmit, and receive timestamps are combined to generate a calibration profile for the hardware. The delay can be extracted and removed directly or the frequency response of the hardware itself can be removed from subsequent measurements.

In another embodiment, the baseband is not full duplex. In this case the transmit packet can be generated independently from the baseband. The raw data for a packet can be stored in memory and read out directly to a digital-to-analog converter (DAC). It goes through the transmit (TX) and receive (RX) RF chains as before. The baseband is set to be in receive mode and can capture the CSI and timestamp of the incoming packet. The CSI, transmit, and receive timestamps can be used as in the previous case. The transmit timestamp needs to be captured at the time the memory readout to the DAC is triggered.

The implementation of the radio-frequency communication between the terminal nodes and the hubs may be implemented in a variety of ways including narrow-band, channel overlapping, channel stepping, multi-channel wide band, and ultra-wide band communications.

The communication (e.g., ranging, localization, etc.) between hubs, nodes, and wireless devices as discussed herein may be achieved using a variety of means, including but not limited to direct wireless communication using radio frequencies, Powerline communication achieved by modulating signals onto the electrical wiring within the house, apartment, commercial building, etc., WiFi communication using such standard WiFi communication protocols as 802.11a, 802.11b, 802.11n, 802.11ac, and other such Wifi Communication protocols as would be apparent to one of ordinary skill in the art, cellular communication such as GPRS, EDGE, 3G, HSPDA, LTE, 5G, and other cellular communication protocols as would be apparent to one of ordinary skill in the art, Bluetooth communication, communication using well-known wireless sensor network protocols such as Zigbee, and other wire-based or wireless communication schemes as would be apparent to one of ordinary skill in the art.

In one example, any of the RF circuitry described herein can include at least one of LAN RF circuitry, WAN RF circuitry, and/or cellular RF circuitry. Any wireless network architecture described herein can include wireless local area network (LAN), wireless wide area network (WAN), and/or wireless cellular network.

Figures 13A, 13B:
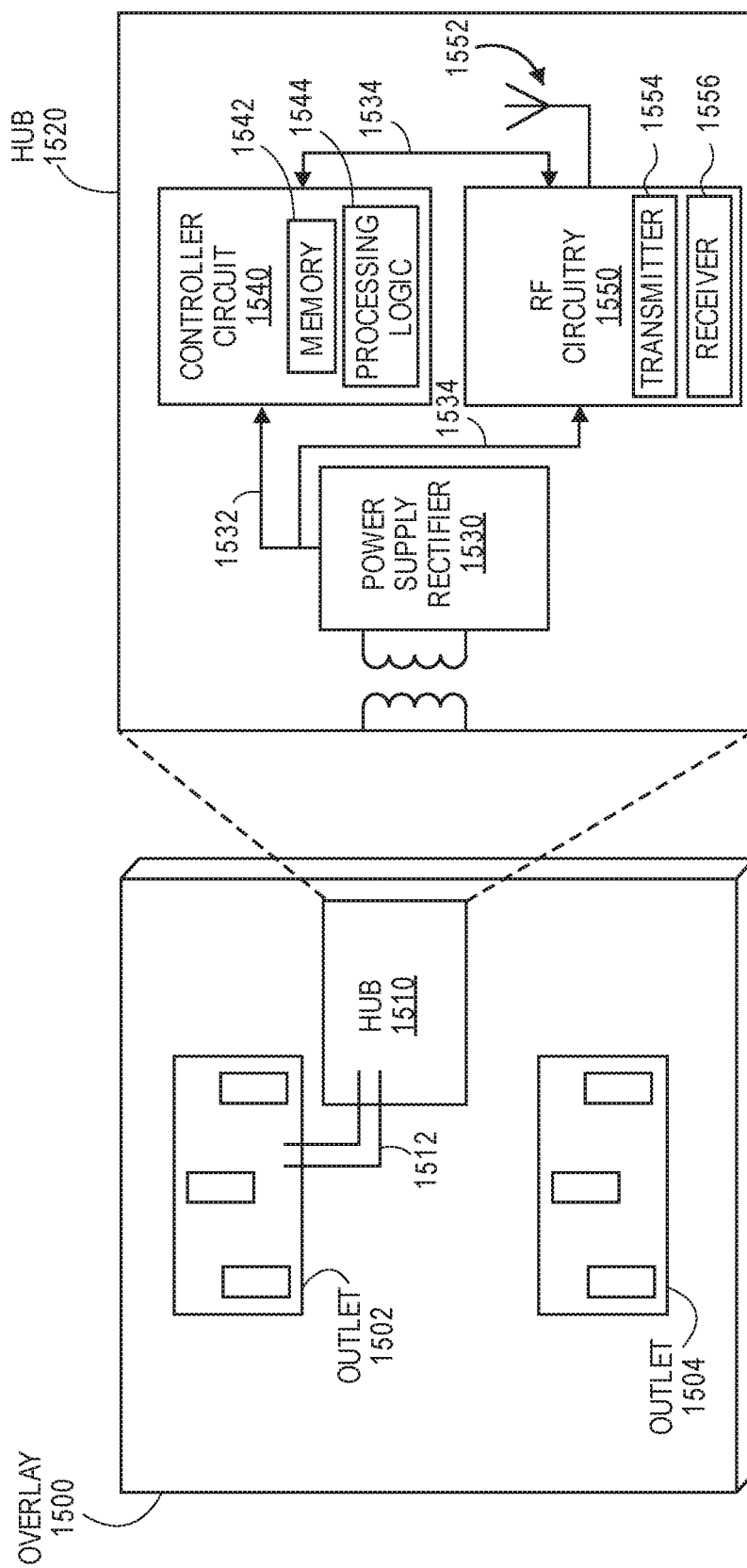
FIG. 13A shows an exemplary embodiment of a hub implemented as an overlay 1500 for an electrical power outlet in accordance with one embodiment.
FIG. 13B shows an exemplary embodiment of an exploded view of a block diagram of a hub implemented as an overlay for an electrical power outlet in accordance with one embodiment.

The hubs may be physically implemented in numerous ways in accordance with embodiments of the invention. FIG. 13A shows an exemplary embodiment of a hub implemented as an overlay 1500 for an electrical power outlet in accordance with one embodiment. The overlay 1500 (e.g., faceplate) includes a hub 1510 and a connection 1512 (e.g., communication link, signal line, electrical connection, etc.) that couples the hub to the electrical outlet 1502. Alternatively (or additionally), the hub is coupled to outlet 1504. The overlay 1500 covers or encloses the electrical outlets 1502 and 1504 for safety and aesthetic purposes.

FIG. 13B shows an exemplary embodiment of an exploded view of a block diagram of a hub 1520 implemented as an overlay for an electrical power outlet in accordance with one embodiment. The hub 1520 includes a power supply rectifier 1530 that converts alternating current (AC), which periodically reverses direction, to direct current (DC) which flows in only one direction. The power supply rectifier 1530 receives AC from the outlet 1502 via connection 1512 (e.g., communication link, signal line, electrical connection, etc.) and converts the AC into DC for supplying power to a controller circuit 1540 via a connection 1532 (e.g., communication link, signal line, electrical connection, etc.) and for supplying power to RF circuitry 1550 via a connection 1534 (e.g., communication link, signal line, electrical connection, etc.). The controller circuit 1540 includes memory 1542 or is coupled to memory that stores instructions which are executed by processing logic 1544 (e.g., one or more processing units) of the controller circuit 1540 for controlling operations of the hub for forming, monitoring, and performing localization of the wireless asymmetrical network as discussed herein. The RF circuitry 1550 may include a transceiver or separate transmitter 1554 and receiver 1556 functionality for sending and receiving bi-directional communications via antenna(s) 1552 with the wireless sensor nodes. The RF circuitry 1550 communicates bi-directionally with the controller circuit 1540 via a connection 1534 (e.g., communication link, signal line, electrical connection, etc.). The hub 1520 can be a wireless control device 1520 or the controller circuit 1540, RF circuitry 1550, and antenna(s) 1552 in combination may form the wireless control device as discussed herein.

Figure 14B:
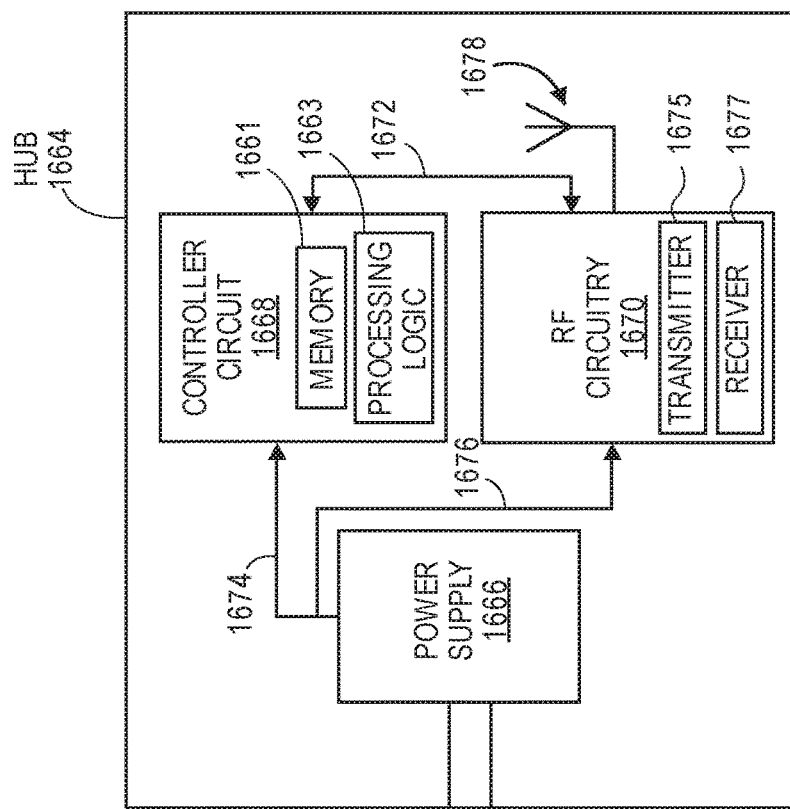
FIG. 14B shows an exemplary embodiment of a block diagram of a hub 964 implemented as a card for deployment in a computer system, appliance, or communication hub in accordance with one embodiment.
Figure 14A:
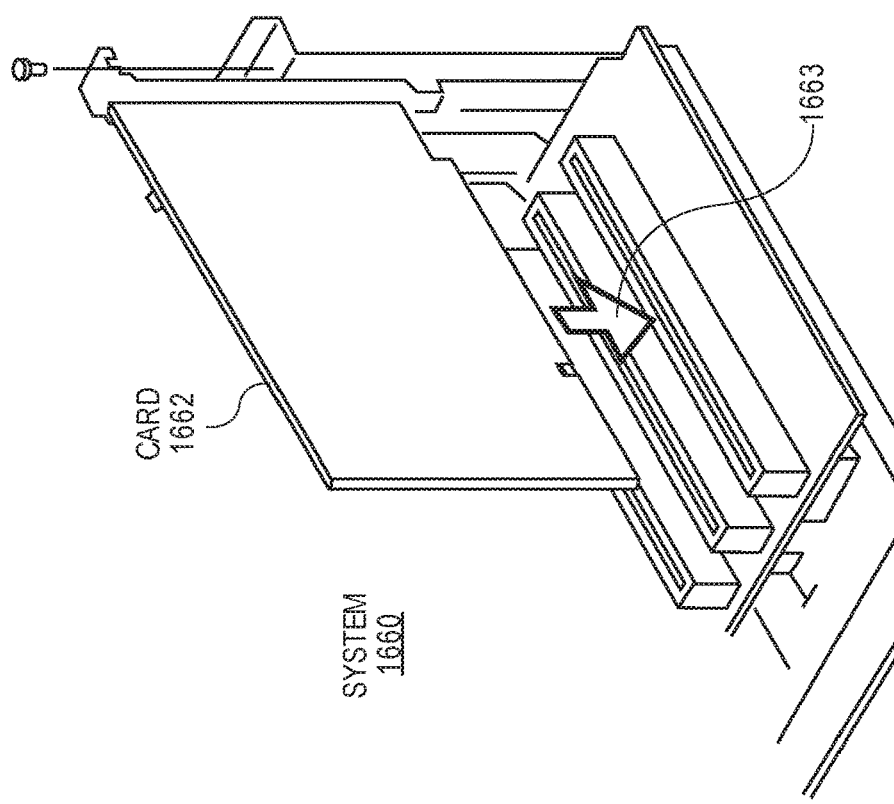
FIG. 14A shows an exemplary embodiment of a hub implemented as a card for deployment in a computer system, appliance, or communication hub in accordance with one embodiment.

FIG. 14A shows an exemplary embodiment of a hub implemented as a card for deployment in a computer system, appliance, or communication hub in accordance with one embodiment. The card 1662 can be inserted into the system 1660 (e.g., computer system, appliance, or communication hub) as indicated by arrow 1663.

FIG. 14B shows an exemplary embodiment of a block diagram of a hub 1664 implemented as a card for deployment in a computer system, appliance, or communication hub in accordance with one embodiment. The hub 1664 includes a power supply 1666 that provides power (e.g., DC power supply) to a controller circuit 1668 via a connection 1674 (e.g., communication link, signal line, electrical connection, etc.) and provides power to RF circuitry 1670 via a connection 1676 (e.g., communication link, signal line, electrical connection, etc.). The controller circuit 1668 includes memory 1661 or is coupled to memory that stores instructions which are executed by processing logic 1663 (e.g., one or more processing units) of the controller circuit 1668 for controlling operations of the hub for forming, monitoring, and performing localization of the wireless asymmetrical network as discussed herein. The RF circuitry 1670 may include a transceiver or separate transmitter 1675 and receiver 1677 functionality for sending and receiving bi-directional communications via antenna(s) 1678 with the wireless sensor nodes. The RF circuitry 1670 communicates bi-directionally with the controller circuit 1668 via a connection 1672 (e.g., communication link, signal line, electrical connection, etc.). The hub 1664 can be a wireless control device 1664 or the controller circuit 1668, RF circuitry 1670, and antenna(s) 1678 in combination may form the wireless control device as discussed herein.

Figure 14D:
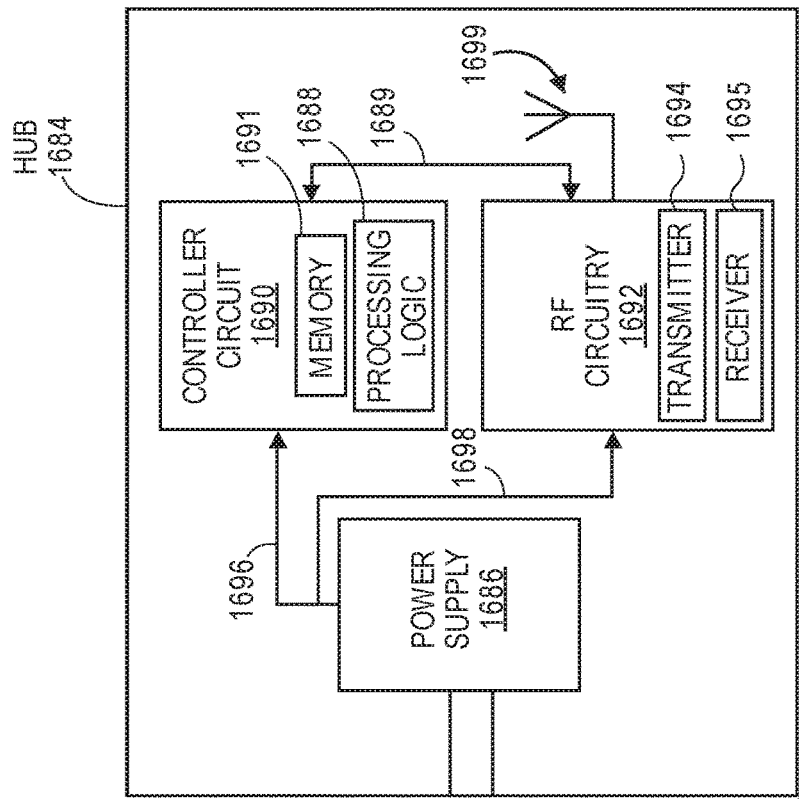
FIG. 14D shows an exemplary embodiment of an exploded view of a block diagram of a hub 1684 implemented within an appliance (e.g., smart washing machine, smart refrigerator, smart thermostat, other smart appliances, etc.) in accordance with one embodiment.
Figure 14C:
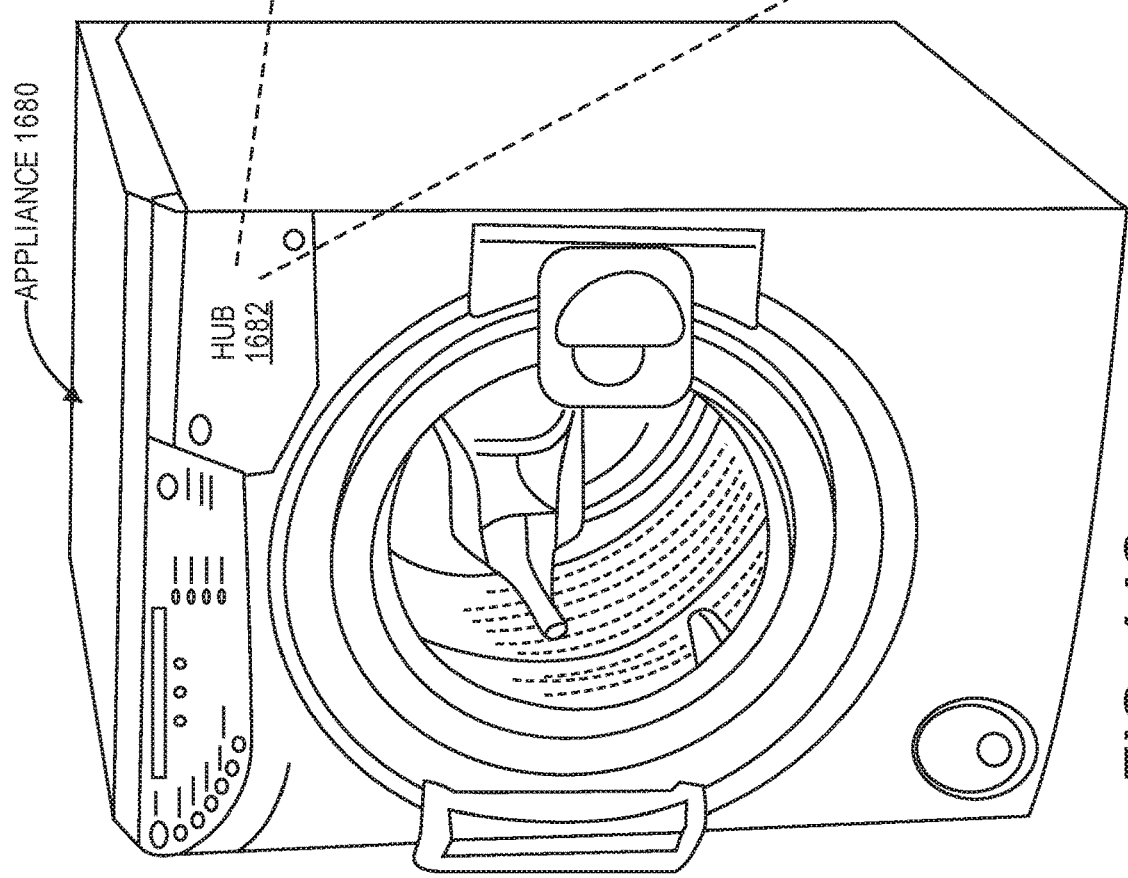
FIG. 14C shows an exemplary embodiment of a hub implemented within an appliance (e.g., smart washing machine, smart refrigerator, smart thermostat, other smart appliances, etc.) in accordance with one embodiment.

FIG. 14C shows an exemplary embodiment of a hub implemented within an appliance (e.g., smart washing machine, smart refrigerator, smart thermostat, other smart appliances, etc.) in accordance with one embodiment. The appliance 1680 (e.g., smart washing machine) includes a hub 1682.

FIG. 14D shows an exemplary embodiment of an exploded view of a block diagram of a hub 1684 implemented within an appliance (e.g., smart washing machine, smart refrigerator, smart thermostat, other smart appliances, etc.) in accordance with one embodiment. The hub includes a power supply 1686 that provides power (e.g., DC power supply) to a controller circuit 1690 via a connection 1696 (e.g., communication link, signal line, electrical connection, etc.) and provides power to RF circuitry 1692 via a connection 1698 (e.g., communication link, signal line, electrical connection, etc.). The controller circuit 1690 includes memory 1691 or is coupled to memory that stores instructions which are executed by processing logic 1688 (e.g., one or more processing units) of the controller circuit 1690 for controlling operations of the hub for forming, monitoring, and performing localization of the wireless asymmetrical network as discussed herein. The RF circuitry 1692 may include a transceiver or separate transmitter 1694 and receiver 1695 functionality for sending and receiving bi-directional communications via antenna(s) 1699 with the wireless sensor nodes. The RF circuitry 1692 communicates bi-directionally with the controller circuit 1690 via a connection 1689 (e.g., communication link, signal line, electrical connection, etc.). The hub 1684 can be a wireless control device 1684 or the controller circuit 1690, RF circuitry 1692, and antenna(s) 1699 in combination may form the wireless control device as discussed herein.

In one embodiment, an apparatus (e.g., hub) for providing a wireless asymmetric network architecture includes a memory for storing instructions, processing logic (e.g., one or more processing units, processing logic 1544, processing logic 1663, processing logic 1688, processing logic 1763, processing logic 1888) of the hub to execute instructions to establish and control communications in a wireless asymmetric network architecture, and radio frequency (RF) circuitry (e.g., RF circuitry 1550, RF circuitry 1670, RF circuitry 1692, RF circuitry 1890) including multiple antennas (e.g., antenna(s) 1552, antenna(s) 1678, antenna(s) 1699, antennas 1311, 1312, and 1313, etc.) to transmit and receive communications in the wireless asymmetric network architecture. The RF circuitry and multiple antennas to transmit communications to a plurality of sensor nodes (e.g., node 1, node 2) each having a wireless device with a transmitter and a receiver (or transmitter and receiver functionality of a transceiver) to enable bi-directional communications with the RF circuitry of the apparatus in the wireless asymmetric network architecture.

In one example, a first wireless node includes a wireless device with one or more processing units and RF circuitry for transmitting and receiving communications in the wireless network architecture including a first RF signal having a first packet. A second wireless node includes a wireless device with a transmitter and a receiver to enable bi-directional communications with the first wireless node in the wireless network architecture including a second RF signal with a second packet. The one or more processing units of the first wireless node are configured to execute instructions to determine a round trip time estimate of the first and second packets, to determine channel state information (CSI) of the first and second wireless nodes, and to calibrate hardware to determine hardware delays of the first and second wireless nodes.

In one example, the apparatus is powered by a mains electrical source and the plurality of sensor nodes are each powered by a battery source to form the wireless network architecture.

Various batteries could be used in the wireless sensor nodes, including lithium-based chemistries such as Lithium Ion, Lithium Polymer, Lithium Phosphate, and other such chemistries as would be apparent to one of ordinary skill in the art. Additional chemistries that could be used include Nickel metal hydride, standard alkaline battery chemistries, Silver Zinc and Zinc Air battery chemistries, standard Carbon Zinc battery chemistries, lead Acid battery chemistries, or any other chemistry as would be obvious to one of ordinary skill in the art.

The present invention also relates to an apparatus for performing the operations described herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method operations.

Figure 15:
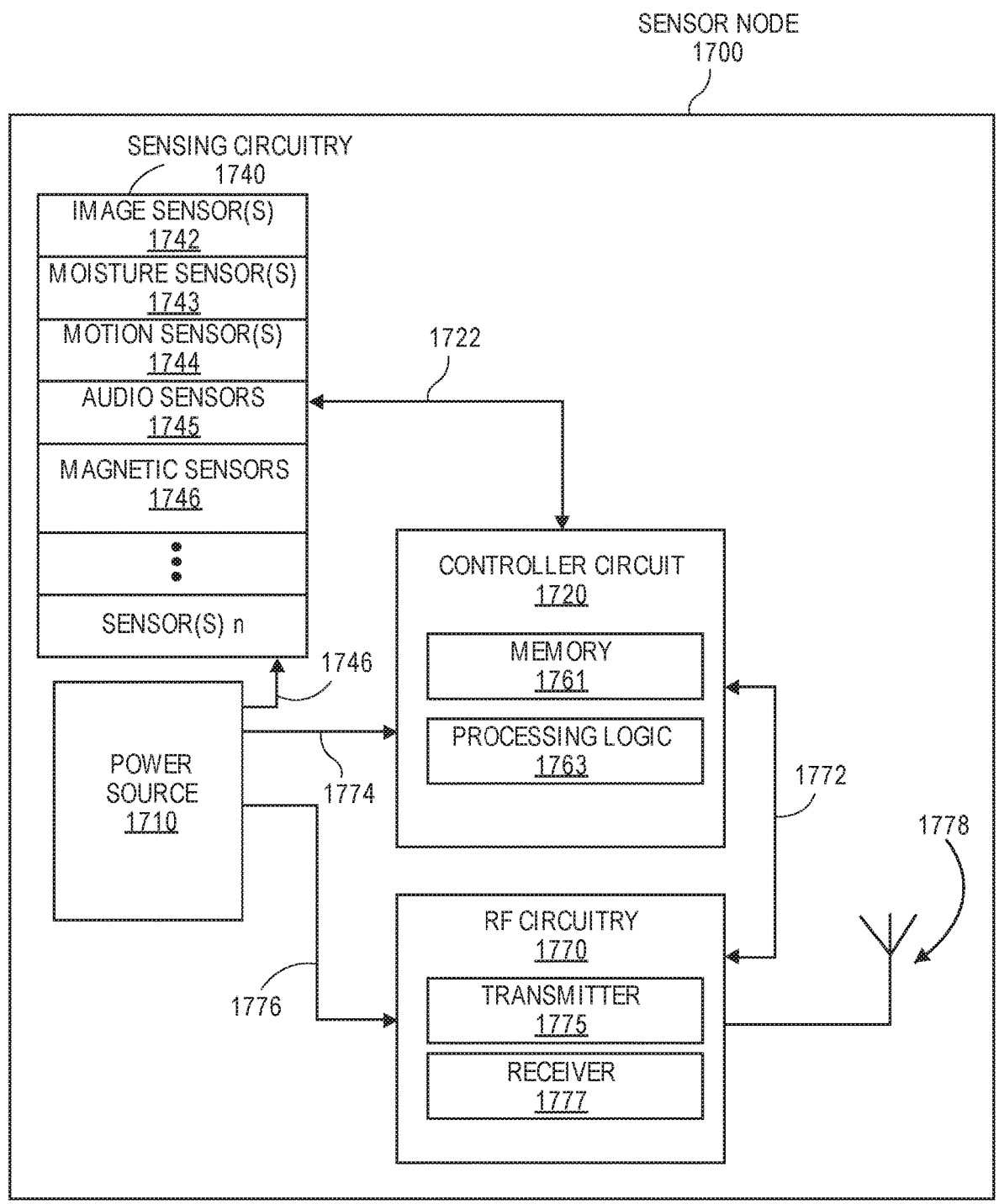
FIG. 15 illustrates a block diagram of a sensor node in accordance with one embodiment.

FIG. 15 illustrates a block diagram of a sensor node in accordance with one embodiment. The sensor node 1700 includes a power source 1710 (e.g., energy source, battery source, primary cell, rechargeable cell, etc.) that provides power (e.g., DC power supply) to a controller circuit 1720 via a connection 1774 (e.g., communication link, signal line, electrical connection, etc.), provides power to RF circuitry 1770 via a connection 1776 (e.g., communication link, signal line, electrical connection, etc.), and provides power to sensing circuitry 1740 via a connection 1746 (e.g., communication link, signal line, electrical connection, etc.). The controller circuit 1720 includes memory 1761 or is coupled to memory that stores instructions which are executed by processing logic 1763 (e.g., one or more processing units) of the controller circuit 1720 for controlling operations of the sensor node for forming and monitoring the wireless asymmetrical network as discussed herein. The RF circuitry 1770 (e.g., communication circuitry) may include a transceiver or separate transmitter 1775 and receiver 1777 functionality for sending and receiving bi-directional communications via antenna(s) 1778 with the hub(s) and optional wireless sensor nodes. The RF circuitry 1770 communicates bi-directionally with the controller circuit 1720 via a connection 1772 (e.g., electrical connection). The sensing circuitry 1740 includes various types of sensing circuitry and sensor(s) including image sensor(s) and circuitry 1742, moisture sensor(s) and circuitry 1743, temperature sensor(s) and circuitry, humidity sensor(s) and circuitry, air quality sensor(s) and circuitry, light sensor(s) and circuitry, motion sensor(s) and circuitry 1744, audio sensor(s) and circuitry 1745, magnetic sensor(s) and circuitry 1746, and sensor(s) and circuitry n, etc.

The wireless localization techniques disclosed herein may be combined with other sensed information to improve localization accuracy of the overall network. For example, in wireless sensors in which one or more of the nodes contain cameras, captured images can be used with image processing and machine learning techniques to determine whether the sensor nodes that are being monitored are looking at the same scene and are therefore likely in the same room. Similar benefits can be achieved by using periodic illumination and photodetectors. By strobing the illumination and detecting using the photodetectors, the presence of an optical path can be detected, likely indicating the absence of opaque walls between the strobe and the detector. In other embodiments, magnetic sensors can be integrated into the sensor nodes and used as a compass to detect the orientation of the sensor node that is being monitored. This information can then be used along with localization information to determine whether the sensor is on the wall, floor, ceiling, or other location.

In one example, each sensor node may include an image sensor and each perimeter wall of a house includes one or more sensor nodes. A hub analyzes sensor data including image data and optionally orientation data along with localization information to determine absolute locations for each sensor node. The hub can then build a three dimensional image of each room of a building for a user. A floor plan can be generated with locations for walls, windows, doors, etc. Image sensors may capture images indicating a change in reflections that can indicate home integrity issues (e.g., water, leaking roof, etc.).

Figure 16:
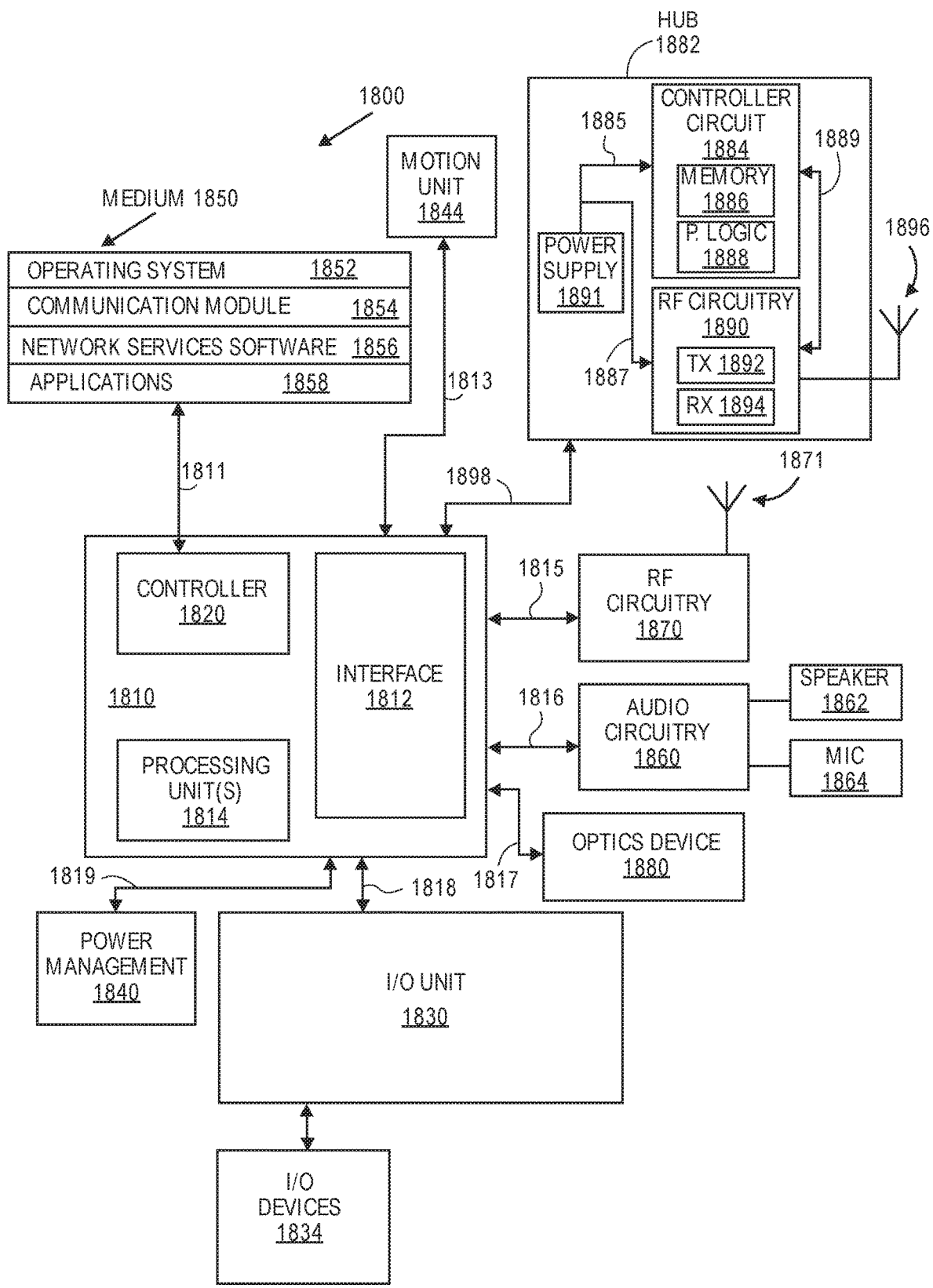
FIG. 16 illustrates a block diagram of a system or appliance 1800 having a hub in accordance with one embodiment.

FIG. 16 illustrates a block diagram of a system 1800 having a hub in accordance with one embodiment. The system 1800 includes or is integrated with a hub 1882 or central hub of a wireless asymmetric network architecture. The system 1800 (e.g., computing device, smart TV, smart appliance, communication system, etc.) may communicate with any type of wireless device (e.g., cellular phone, wireless phone, tablet, computing device, smart TV, smart appliance, etc.) for sending and receiving wireless communications. The system 1800 includes a processing system 1810 that includes a controller 1820 and processing units 1814. The processing system 1810 communicates with the hub 1882, an Input/Output (I/O) unit 1830, radio frequency (RF) circuitry 1870, audio circuitry 1860, an optics device 1880 for capturing one or more images or video, an optional motion unit 1844 (e.g., an accelerometer, gyroscope, etc.) for determining motion data (e.g., in three dimensions) for the system 1800, a power management system 1840, and machine-accessible non-transitory medium 1850 via one or more bi-directional communication links or signal lines 1898, 1818, 1815, 1816, 1817, 1813, 1819, 1811, respectively.

The hub 1882 includes a power supply 1891 that provides power (e.g., DC power supply) to a controller circuit 1884 via a connection 1885 (e.g., communication link, signal line, electrical connection, etc.) and provides power to RF circuitry 1890 via a connection 1887 (e.g., communication link, signal line, electrical connection, etc.). The controller circuit 1884 includes memory 1886 or is coupled to memory that stores instructions which are executed by processing logic 1888 (e.g., one or more processing units) of the controller circuit 1884 for controlling operations of the hub for forming and monitoring the wireless asymmetrical network as discussed herein. The RF circuitry 1890 may include a transceiver or separate transmitter (TX) 1892 and receiver (RX) 1894 functionality for sending and receiving bi-directional communications via antenna(s) 1896 with the wireless sensor nodes or other hubs. The RF circuitry 1890 communicates bi-directionally with the controller circuit 1884 via a connection 1889 (e.g., communication link, signal line, electrical connection, etc.). The hub 1882 can be a wireless control device 1884 or the controller circuit 1884, RF circuitry 1890, and antenna(s) 1896 in combination may form the wireless control device as discussed herein.

RF circuitry 1870 and antenna(s) 1871 of the system or RF circuitry 1890 and antenna(s) 1896 of the hub 1882 are used to send and receive information over a wireless link or network to one or more other wireless devices of the hubs or sensors nodes discussed herein. Audio circuitry 1860 is coupled to audio speaker 1862 and microphone 1064 and includes known circuitry for processing voice signals. One or more processing units 1814 communicate with one or more machine-accessible non-transitory mediums 1850 (e.g., computer-readable medium) via controller 1820. Medium 1850 can be any device or medium (e.g., storage device, storage medium) that can store code and/or data for use by one or more processing units 1814. Medium 1850 can include a memory hierarchy, including but not limited to cache, main memory and secondary memory.

The medium 1850 or memory 1886 stores one or more sets of instructions (or software) embodying any one or more of the methodologies or functions described herein. The software may include an operating system 1852, network services software 1856 for establishing, monitoring, and controlling wireless asymmetric network architectures, communications module 1854, and applications 1858 (e.g., home or building security applications, home or building integrity applications, developer applications, etc.). The software may also reside, completely or at least partially, within the medium 1850, memory 1886, processing logic 1888, or within the processing units 1814 during execution thereof by the device 1800. The components shown in FIG. 18 may be implemented in hardware, software, firmware or any combination thereof, including one or more signal processing and/or application specific integrated circuits.

Communication module 1854 enables communication with other devices. The I/O unit 1830 communicates with different types of input/output (I/O) devices 1834 (e.g., a display, a liquid crystal display (LCD), a plasma display, a cathode ray tube (CRT), touch display device, or touch screen for receiving user input and displaying output, an optional alphanumeric input device).

FIG. 17 illustrates a method for localization of wireless devices that utilizes building information of a wireless sensor network in accordance with one embodiment. The operations of this method may be executed by a wireless device, a wireless control device of a hub (e.g., an apparatus), a system, or a remote device, computer, or cloud service which includes processing circuitry or processing logic. The processing logic may include hardware (circuitry, dedicated logic, etc.), software (such as is run on a general purpose computer system or a dedicated machine or a device), or a combination of both. In one embodiment, an anchor node, a hub, a wireless device, or a remote device, computer, or cloud service performs the operations of this method. Algorithms associated with the various computations may be performed in a remote computer to which the relevant data associated with timing and distance measurements is sent. The remote device or computer may be at a different location (e.g., different network, in the cloud) than the wireless network architecture having a plurality of wireless nodes. The remote device or computer may be at a different location within the wireless network architecture than certain nodes that are transmitted and receiving communications within the wireless network architecture.

Devices can be arbitrarily placed at known, fixed locations typically within a building. Upon initialization of a wireless network architecture, at operation 1701, a wireless node (e.g., anchor node, wireless device, hub) having radio frequency (RF) circuitry and at least one antenna transmits communications to a plurality of sensor nodes in the wireless network architecture (e.g., wireless asymmetric network architecture). At operation 1702, the RF circuitry and at least one antenna of the wireless node receives communications from the plurality of sensor nodes each having a wireless device with a transmitter and a receiver to enable bi-directional communications with the RF circuitry of the wireless node in the wireless network architecture. At operation 1704, processing logic of the wireless node having a wireless control device initially causes a wireless network of sensor nodes to be configured as a mesh-based network architecture for a time period (e.g., predetermined time period, time period sufficient for localization, etc.) for localization of at least one wireless device (wireless node).

At operation 1706, the wireless node can then perform ranging with the sensor nodes (any or all pair combinations between wireless nodes and wireless sensor nodes) to determining ranging data including distance estimates between nodes. At operation 1708, a set of known locations (e.g., WiFi router 892 of FIG. 8B, air conditioning units, corner region 894, etc.) within an environment (e.g., indoor environment, building, exterior region adjacent to a building) and device to device ranging data is then used to associate each wireless node or wireless sensor node with a unique known location. At operation 1710, numerous methods including at least one of brute force calculation, triangulation, and numerical optimizers can be used to determine the locations of anchor nodes (e.g., wireless nodes, wireless sensor nodes) that correspond to the measured ranging data. Probabilistic methods such as those described in the present patent application can also be used.

At operation 1712, given knowledge of a possible subset of anchor locations, the known subset of anchor locations can optionally be used to fit or snap to a map of the known environment. For example, a user can adjust the rotation, translation, and mirroring of the subset of anchor locations to align them to a physical description of the space or environment (e.g., floorplan, map, etc). Additional anchor locations may be determined based on operation 1712.

Once these anchor locations have been determined, at operation 1714 these anchor nodes and associated anchor location are utilized for ranging measurements between the anchor nodes and any nodes having an unknown location (e.g., fixed or moving locations). These anchor nodes can be used for ToA or TDoA ranging measurements. At operation 1716, numerous methods including at least one of brute force calculation, triangulation, and numerical optimizers can be used to determine the unknown locations for nodes (e.g., wireless nodes, wireless sensor nodes) that correspond to the measured ranging data. At operation 1718, the processing logic of the wireless node (e.g., hub, anchor node, wireless device, remote device or computer) configures the wireless network in a tree based or tree-like network architecture (or tree architecture with no mesh-based features) upon completion of localization.

In an alternative embodiment, building information is not known. FIG. 18 illustrates a method for localization of wireless devices with no building information of a wireless sensor network in accordance with one embodiment. The operations of this method may be executed by a wireless device, a wireless control device of a hub (e.g., an apparatus), a system, or a remote device, computer, or cloud service which includes processing circuitry or processing logic. The processing logic may include hardware (circuitry, dedicated logic, etc.), software (such as is run on a general purpose computer system or a dedicated machine or a device), or a combination of both. In one embodiment, an anchor node, a hub, a wireless device, or a remote device, computer, or cloud service performs the operations of this method. Algorithms associated with the various computations may be performed in a remote computer to which the relevant data associated with timing and distance measurements is sent. The remote device or computer may be at a different location (e.g., different network, in the cloud) than the wireless network architecture having a plurality of wireless nodes. The remote device or computer may be at a different location within the wireless network architecture than certain nodes that are transmitted and receiving communications within the wireless network architecture.

Devices can be arbitrarily placed at unknown, fixed locations typically within a building. Upon initialization of a wireless network architecture, at operation 1801, a wireless node (e.g., anchor node, wireless device, hub) having radio frequency (RF) circuitry and at least one antenna transmits communications to a plurality of sensor nodes in the wireless network architecture (e.g., wireless asymmetric network architecture). The sensor nodes may typically be stationary and are capable of being moved or repositioned within the wireless network architecture. At operation 1802, the RF circuitry and at least one antenna of the wireless node receives communications from the plurality of sensor nodes each having a wireless device with a transmitter and a receiver to enable bi-directional communications with the RF circuitry of the wireless node in the wireless network architecture. At operation 1804, processing logic of the wireless node having a wireless control device initially causes a wireless network of sensor nodes to be configured as a mesh-based network architecture for a time period (e.g., predetermined time period, time period sufficient for localization, etc.) for localization of at least one wireless device (wireless node).

At operation 1806, the wireless node can then perform ranging with the sensor nodes (any or all pair combinations between wireless nodes and wireless sensor nodes) to determine ranging data including distance estimates between nodes. At operation 1808, device to device ranging data is then used to associate at least one wireless node or wireless sensor node with a relative location. Relative locations of all anchor nodes or at least a subset of anchor nodes are determined using at least one of optimization techniques, brute force methods, probabilistic methods, etc. Multiple path estimates for each range can be fed into the algorithm for calculating the relative locations.

At operation 1810, the rotation, translation, and mirroring of a full set of relative positions are adjusted to align them to a physical description of the space or environment (e.g., floorplan, map, etc). Machine learning, artificial intelligence, or a user may perform these adjustments. In one example, machine learning generates a likely set of orientations for relative positions with respect to the space or environment and then a user selects one of the orientations. These adjustments place the anchor positions in the coordinate system of the space or environment. At operation 1812, these anchor nodes and their calculated positions within the space or environment are determined.

Once these anchor locations have been determined, at operation 1814 these anchor nodes and associated anchor locations are utilized for ranging measurements between the anchor nodes and any nodes having an unknown location (e.g., fixed or moving locations). These anchor nodes can be used for ToA or TDoA ranging measurements. At operation 1816, numerous methods including at least one of brute force calculation, triangulation, and numerical optimizers can be used to determine the unknown locations for nodes (e.g., wireless nodes, wireless sensor nodes) that correspond to the measured ranging data. At operation 1818, the processing logic of the wireless node (e.g., hub, anchor node, wireless device, remote device or computer) configures the wireless network in a tree based or tree-like network architecture (or tree architecture with no mesh-based features) upon completion of localization.

Any of the following examples can be combined into a single embodiment or these examples can be separate embodiments. In one example of a first embodiment, a system for localization of nodes in a wireless network architecture comprises a first wireless node having a wireless device with one or more processing units and RF circuitry for transmitting and receiving communications in the wireless network architecture including a first RF signal having a first packet and a second wireless node having a wireless device with a transmitter and a receiver to enable bi-directional communications with the first wireless node in the wireless network architecture including a second RF signal with a second packet. The one or more processing units of the first wireless node are configured to execute instructions to determine a round trip time estimate of the first and second packets, to determine channel state information (CSI) of the first and second wireless nodes, and to calibrate hardware to determine hardware delays of the first and second wireless nodes.

In another example of the first embodiment, the first wireless node has a first reference clock signal and the second wireless node has a second reference clock signal.

In another example of the first embodiment, the round trip time estimate of the first and second packets is based on a first time when the first wireless node sends the first packet, a second time when the second wireless node receives the first packet, a third time when the second wireless node sends the second packet, and a fourth time when the first wireless node receives the second packet.

In another example of the first embodiment, the channel state information of the first wireless node comprises a first measurement of a channel response of the second packet and the channel state information of the second wireless node comprises a second measurement of a channel response of the first packet.

In another example of the first embodiment, the system further comprises a remote device to enable bi-directional communications with the first and second wireless nodes, wherein at least one of the remote device, the first wireless node, and the second wireless node to determine a delay due to phase drift between reference clocks of the first and second wireless nodes based on the CSI of the first and second wireless nodes.

In another example of the first embodiment, the hardware delays of the first and second wireless nodes comprise automatic gain control (AGC) and low-noise amplifier delays.

In another example of the first embodiment, the AGC and low-noise amplifier delays are removed to correct a round trip time estimate of the first and second packets, wherein at least one of the remote device, the first wireless node, and the second wireless node to apply phase drift delay and hardware delays to the CSI as a linear phase shift to generate corrected CSI.

In another example of the first embodiment, the at least one of the remote device, the first wireless node, and the second wireless node to compute averages of the corrected CSI for a plurality of packets.

In another example of the first embodiment, at least one of the remote device, the first wireless node, and the second wireless node divide the corrected CSI by a calibration CSI to remove hardware delays.

In another example of the first embodiment, at least one of the remote device, the first wireless node, and the second wireless node execute an algorithm to extract delays and complex amplitudes of the paths that combine to create an averaged CSI, wherein non-physical paths may be eliminated using path amplitude, distance, RSSI, and other relevant data as filtering criteria.

In another example of the first embodiment, the nodes in the wireless network architecture comprise anchor nodes to be selected for localization when an error metric that is associated with each distance estimate between an anchor node having a known location and a wireless sensor node having an unknown location is less than or equal to an error threshold.

In another example of the first embodiment, at least one anchor node to be eliminated for localization when the error metric is greater than or equal to the error threshold.

In another example of the first embodiment, at least one of the first and second wireless nodes comprises a moveable robot that changes positions during localization.

In one example of a second embodiment, an apparatus, comprises a memory for storing instructions, one or more processing units to execute instructions for controlling a plurality of sensor nodes in a wireless network architecture and determining locations of the plurality of sensor nodes, and radio frequency (RF) circuitry to transmit communications to and receive communications from the plurality of sensor nodes each having a wireless device with a transmitter and a receiver to enable bi-directional communications with the RF circuitry of the apparatus in the wireless network architecture. The one or more processing units of the apparatus are configured to execute instructions to transmit a first RF signal having a first packet to a sensor node, to receive a second RF signal with a second packet from the sensor node, to determine a round trip time estimate of the first and second packets, to determine channel state information (CSI), and to calibrate hardware to determine hardware delays of at least one of the apparatus and the sensor node.

In another example of the second embodiment, the apparatus has a first reference clock signal and the sensor node has a second reference clock signal.

In another example of the second embodiment, the round trip time estimate of the first and second packets is based on a first time when the apparatus sends the first packet, a second time when the sensor node receives the first packet, a third time when the sensor node sends the second packet, and a fourth time when the apparatus receives the second packet.

In another example of the second embodiment, determining CSI comprises a first measurement of a channel response of the second packet and a second measurement of a channel response of the first packet.

In another example of the second embodiment, the hardware delays of at least one of the apparatus and the sensor node comprise automatic gain control (AGC) and low-noise amplifier delays.

In another example of the second embodiment, the AGC and low-noise amplifier delays are removed to correct the round trip time estimate of the first and second packets.

In another example of the second embodiment, the apparatus to apply phase drift delay and hardware delays to the CSI as a linear phase shift to generate corrected CSI.

In another example of the second embodiment, the one or more processing units of the apparatus are configured to execute instructions to measure first channel state information of a first frequency channel of the first RF signal, measure second channel state information of a second frequency channel of the first RF signal with the first and second frequency channels being non-contiguous or discontinuous channels, and determine delay profile estimation between the apparatus and sensor node based on the first and second channel state information without phase alignment.

In another example of the second embodiment, the delay profile estimation is determined without channel state information for a frequency band gap between the first and second frequency channels.

In one example of a third embodiment, a method for localization of wireless nodes comprises transmitting a first RF signal from a first wireless node to a second wireless node, receiving a second RF signal with the first wireless node from the second wireless node, obtaining channel state information (CSI) for the first and second wireless nodes, and removing automatic gain control (AGC) delays to correct a coarse time of flight estimate of a first packet sent with the first RF signal and a second packet sent with the second RF signal.

In another example of the third embodiment, the method further comprises removing edges of a frequency spectrum including highest and lowest subcarriers of the first and second RF signals.

In another example of the third embodiment, the method further comprises determining a delay due to phase drift between the first and second wireless nodes by dividing a forward CSI by a reverse CSI.

In another example of the third embodiment, the method further comprises obtaining internal delays including AGC delay and Low-noise amplifier (LNA) delay for the first and second wireless nodes, summing corrections for phase drift, AGC gain, and the coarse time of flight estimate, and applying these corrections to the CSI as a linear phase shift.

In one example of a fourth embodiment, a computer-implemented method comprises generating, with a first wireless node, a first loopback calibration signal, passing the first loopback calibration signal through a RF transmit chain of the first wireless node and through a RF receive chain of the first wireless node, and measuring at least one selected from a group of a first transmit time delay, a first receive time delay, a first transmit channel state information, and a first receive channel state information for passing the first loopback calibration signal through the transmit chain and through the receive chain of the first wireless node to determine hardware delays of the first wireless node.

In another example of the fourth embodiment, measuring at least one of a first transmit time delay, a first receive time delay, a first transmit channel state information, or a first receive channel state information comprises measuring a sum of the first transmit time delay and the first receive time delay, wherein measuring the first transmit channel state information and the first receive channel state information comprises a product of the first transmit channel state information and the first receive channel state information.

In another example of the fourth embodiment, the method further comprises generating, with a second wireless node, a second loopback calibration signal; passing the second loopback calibration signal through a RF transmit chain of the second wireless node and through a RF receive chain of the second wireless node; and measuring at least one of a second transmit time delay, a second receive time delay, a first transmit channel state information, or a first receive channel state information for passing the second loopback calibration signal through the transmit chain and through the receive chain of the second wireless node to determine hardware delays of the second wireless node.

In another example of the fourth embodiment, the method further comprises calculating a time delay $T_{lb1}$ of the first loopback calibration signal based on the first transmit time delay $T_{tx1}$ and the first receive time delay $T_{rx1}$ for the first wireless node; calculating a time delay $T_{lb2}$ of the second calibration signal calculated based on the second transmit time delay $T_{tx2}$ and the second receive time delay $T_{rx2}$ for the second wireless node; and correcting a measured round trip time (RTT) for communications transmitted between the first and second wireless nodes based on the $T_{lb1}$ and $T_{lb2}$.

In another example of the fourth embodiment, the method further comprises calculating a loopback channel state information $H_{lb1}$ of the first loopback calibration signal based on the first transmit channel state information $H_{tx1}$ and the first receive channel state information $H_{rx1}$ for the first wireless node; calculating a loopback channel state information $H_{lb2}$ of the second calibration signal calculated based on the second transmit channel state information $H_{tx2}$ and the second receive channel state information $H_{rx2}$ for the second wireless node; and estimating a corrected multipath delay profile that is calculated based on any received data packet channel state information (CSIs) from the first and second wireless node and the loopback channel state information ($H_{lb1}*H_{lb2}$) from the loopback measurements of the first and the second wireless device.

In another example of the fourth embodiment, the method further comprises calibrating a frequency response $H_{lb1}$ of the transmit chain and the receive chain for the first wireless node based on a frequency response of the transmit chain $H_{tx1}$ and a frequency response of the receive chain $H_{rx1}$ for the first wireless node; and calibrating a frequency response $H_{lb2}$ of the transmit chain and the receive chain for the second wireless node based on a frequency response of the transmit chain $H_{tx2}$ and a frequency response of the receive chain $H_{rx2}$ for the second wireless node.

In one example of a fifth embodiment, a system for localization of nodes in a wireless network architecture, comprises a plurality of wireless anchor nodes each having a known location and a wireless device with one or more processing units and RF circuitry for transmitting and receiving communications in the wireless network architecture; and a wireless node having a wireless device with a transmitter and a receiver to enable bi-directional communications with the plurality of wireless anchor nodes in the wireless network architecture, wherein one or more processing units of at least one of the plurality of wireless anchor nodes are configured to execute instructions to determine a set of possible ranges between each anchor node and the wireless node having an unknown location and to perform a triangulation algorithm that iterates through possible locations of the wireless node to minimize error.

In another example of the fifth embodiment, the triangulation algorithm to evaluate the set of possible ranges between each anchor node and the wireless node and to eliminate unlikely ranges between each anchor node and the wireless node.

In another example of the fifth embodiment, the triangulation algorithm to determine a final location for the wireless node with reduced iterations based on eliminating unlikely ranges between each anchor node and the wireless node.

In another example of the fifth embodiment, at least one anchor node to be selected for localization when an error metric that is associated with each distance estimate between an anchor node having a known location and the wireless sensor node having an unknown location is less than or equal to an error threshold.

In another example of the fifth embodiment, at least one anchor node to be eliminated for localization when the error metric is greater than or equal to the error threshold.

In another example of the fifth embodiment, at least one of the anchor nodes comprises a moveable robot that changes positions from a first anchor node position to a second anchor node position during localization.

In one example of a sixth embodiment, an apparatus for localization of nodes in a wireless network architecture, comprises a memory for storing instructions; one or more processing units to execute instructions for controlling a plurality of wireless sensor nodes in a wireless network architecture and determining locations of the plurality of wireless sensor nodes; and radio frequency (RF) circuitry to transmit communications to and receive communications from the plurality of wireless sensor nodes each having a wireless device with a transmitter and a receiver to enable bi-directional communications with the RF circuitry of the apparatus in the wireless network architecture, wherein the one or more processing units of the apparatus are configured to execute instructions to determine a set of possible ranges between the apparatus and a wireless sensor node having an unknown location and to perform a triangulation algorithm that iterates through possible locations of the wireless sensor node to minimize error.

In another example of the sixth embodiment, the triangulation algorithm to evaluate the set of possible ranges between the apparatus and the wireless sensor node and to eliminate unlikely ranges between the apparatus and the wireless sensor node.

In another example of the sixth embodiment, the triangulation algorithm to determine a final location for the wireless sensor node with reduced iterations based on eliminating unlikely ranges between the apparatus and the wireless sensor node.

In another example of the sixth embodiment, the one or more processing units of the apparatus are configured to execute instructions to measure a first channel state information of a first frequency channel of a RF signal that is received from the wireless sensor node, to measure second channel state information of a second frequency channel of the RF signal with the first and second frequency channels being non-contiguous or discontinuous channels, to determine delay profile estimation between the apparatus and the wireless sensor node based on the first and second channel state information without phase alignment.

In another example of the sixth embodiment, the delay profile estimation is determined without channel state information for a frequency band gap between the first and second frequency channels.

In another example of the sixth embodiment, the apparatus comprises a moveable robot that changes positions within an indoor environment from a first anchor node position to a second anchor node position during localization.

In one example of a seventh embodiment, a method for localization of nodes in a wireless network architecture, comprises transmitting, with a plurality of wireless anchor nodes each having a known location, communications to a wireless node; receiving communications from the wireless node; determining a set of possible ranges between each anchor node and the wireless node having an unknown location; and performing a triangulation algorithm that iterates through possible locations of the wireless node to minimize error.

In another example of the seventh embodiment, the method further comprises evaluating the set of possible ranges between each anchor node and the wireless node; and eliminating unlikely ranges between each anchor node and the wireless node.

In another example of the seventh embodiment, the method further comprises determining a final location for the wireless node with reduced iterations based on eliminating unlikely ranges between each anchor node and the wireless node.

In another example of the seventh embodiment, at least one anchor node to be selected for localization when an error metric that is associated with each distance estimate between an anchor node having a known location and the wireless sensor node having an unknown location is less than or equal to an error threshold.

In another example of the seventh embodiment, at least one anchor node to be eliminated for localization when the error metric is greater than or equal to the error threshold.

In another example of the seventh embodiment, at least one of the anchor nodes comprises a moveable robot that changes positions from a first anchor node position to a second anchor node position during localization.

In one example of an eighth embodiment, a system for localization of nodes in a wireless network architecture, comprises a plurality of wireless anchor nodes each having a known location and a wireless device with one or more processing units and RF circuitry for transmitting and receiving communications in the wireless network architecture; and a wireless node having a wireless device with a transmitter and a receiver to enable bi-directional communications with the plurality of wireless anchor nodes in the wireless network architecture, wherein one or more processing units of at least one of the plurality of wireless anchor nodes are configured to execute instructions to determine a set of possible ranges between each anchor node and the wireless node having an unknown location and to perform a triangulation algorithm that utilizes a maximum likelihood estimation (MLE) of ranging measurements from anchor nodes.

In another example of the eighth embodiment, the MLE of ranging measurements from anchor nodes is based on a probability distribution for ranging measurements and position hypothesis for each anchor node.

In another example of the eighth embodiment, the MLE of ranging measurements from anchor nodes is based on an uncertainty in a ranging measurement from the wireless node to an anchor node as determined in the ranging measurement, and a distance from the anchor node to a current position hypothesis.

In another example of the eighth embodiment, the MLE reduces importance of high uncertainty measurements on overall triangulation estimation by effectively weighting high uncertainty measurements less than other measurements for determining a final location of the wireless node.

In another example of the eighth embodiment, at least one anchor node to be selected for localization when an error metric that is associated with each distance estimate between an anchor node having a known location and the wireless sensor node having an unknown location is less than or equal to an error threshold.

In another example of the eighth embodiment, at least one anchor node to be eliminated for localization when the error metric is greater than or equal to the error threshold.

In another example of the eighth embodiment, at least one of the anchor nodes comprises a moveable robot that changes positions from a first anchor node position to a second anchor node position during localization.

In one example of a ninth embodiment, an apparatus for localization of nodes in a wireless network architecture, comprises a memory for storing instructions; one or more processing units to execute instructions for controlling a plurality of wireless sensor nodes in a wireless network architecture and determining locations of the plurality of wireless sensor nodes; and radio frequency (RF) circuitry to transmit communications to and receive communications from the plurality of wireless sensor nodes each having a wireless device with a transmitter and a receiver to enable bi-directional communications with the RF circuitry of the apparatus in the wireless network architecture, wherein the one or more processing units of the apparatus are configured to execute instructions to determine a set of possible ranges between the apparatus and a wireless sensor node having an unknown location and to perform a triangulation algorithm that utilizes a maximum likelihood estimation (MLE) of ranging measurements from anchor nodes including the apparatus.

In another example of the ninth embodiment, the MLE of ranging measurements from anchor nodes is based on a probability distribution for ranging measurements and position hypothesis for each anchor node.

In another example of the ninth embodiment, the MLE of ranging measurements from anchor nodes is based on an uncertainty in a ranging measurement from the wireless node to an anchor node as determined in the ranging measurement, and a distance from the anchor node to a current position hypothesis.

In another example of the ninth embodiment, the MLE reduces importance of high uncertainty measurements on overall triangulation estimation by effectively weighting high uncertainty measurements less than other measurements for determining a final location of the wireless node.

In another example of the ninth embodiment, the one or more processing units of the apparatus are configured to execute instructions to measure a first channel state information of a first frequency channel of a RF signal that is received from the wireless sensor node, to measure second channel state information of a second frequency channel of the RF signal with the first and second frequency channels being non-contiguous or discontinuous channels, to determine delay profile estimation between the apparatus and the wireless sensor node based on the first and second channel state information without phase alignment.

In another example of the ninth embodiment, the delay profile estimation is determined without channel state information for a frequency band gap between the first and second frequency channels.

In another example of the ninth embodiment, the apparatus comprises a moveable robot that changes positions within an indoor environment from a first anchor node position to a second anchor node position during localization.

In one example of a tenth embodiment, a method for localization of nodes in a wireless network architecture, comprises transmitting, with a plurality of wireless anchor nodes each having a known location, communications to a wireless node; receiving communications from the wireless node; determining a set of possible ranges between each anchor node and the wireless node having an unknown location; and performing a triangulation algorithm that utilizes a maximum likelihood estimation (MLE) of ranging measurements from anchor nodes including the apparatus.

In another example of the tenth embodiment, the MLE of ranging measurements from anchor nodes is based on a probability distribution for ranging measurements and position hypothesis for each anchor node.

In another example of the tenth embodiment, the MLE of ranging measurements from anchor nodes is based on an uncertainty in a ranging measurement from the wireless node to an anchor node as determined in the ranging measurement, and a distance from the anchor node to a current position hypothesis.

In another example of the tenth embodiment, the MLE reduces importance of high uncertainty measurements on overall triangulation estimation by effectively weighting high uncertainty measurements less than other measurements for determining a final location of the wireless node.

In another example of the tenth embodiment, the method further comprises selecting at least one anchor node for localization when an error metric that is associated with each distance estimate between an anchor node having a known location and the wireless sensor node having an unknown location is less than or equal to an error threshold.

In another example of the tenth embodiment, the method further comprises eliminating at least one anchor node for localization when the error metric is greater than or equal to the error threshold.

In another example of the tenth embodiment, the method further comprises at least one of the anchor nodes comprises a moveable robot that changes positions from a first anchor node position to a second anchor node position during localization.

In one example of an eleventh embodiment, a system for localization of nodes in a wireless network architecture, comprises a wireless node having a wireless device with one or more processing units and RF circuitry for transmitting and receiving communications in the wireless network architecture; and a plurality of wireless sensor nodes having a wireless device with a transmitter and a receiver to enable bi-directional communications with the wireless node in the wireless network architecture, wherein one or more processing units of the wireless node are configured to execute instructions to determine ranging data including a set of possible ranges between the wireless node and the plurality of wireless sensor nodes having unknown locations, and to associate each wireless node or wireless sensor node with a unique known location within an environment of the wireless network architecture.

In another example of the eleventh embodiment, the system further comprises a remote device that is external to the environment of the wireless network architecture.

In another example of the eleventh embodiment, the remote device or the one or more processing units of the wireless node are configured to perform a brute force calculation, triangulation, or numerical optimizer algorithm to determine locations of at least a subset of anchor nodes that correspond to the ranging data.

In another example of the eleventh embodiment, the locations of at least a subset of anchor nodes are utilized to adjust at least one of rotation, translation, and mirroring of the anchor locations to align the anchor locations to a physical description of the environment of the wireless network architecture.

In another example of the eleventh embodiment, the remote device or the one or more processing units of the wireless node are configured to perform ranging measurements between the at least subset of anchor nodes and any nodes having an unknown fixed or moving location.

In another example of the eleventh embodiment, the ranging measurements include time of arrival ranging measurements.

In another example of the eleventh embodiment, the ranging measurements include time difference of arrival ranging measurements.

In another example of the eleventh embodiment, the remote device or the one or more processing units of the wireless node are configured to perform a brute force calculation, triangulation, or numerical optimizer algorithm to use the ranging measurements to determine locations of any nodes having an unknown fixed or moving location.

In one example of a twelfth embodiment, an apparatus for localization of nodes in a wireless network architecture, comprises a memory for storing instructions; one or more processing units to execute instructions for controlling a plurality of wireless sensor nodes in a wireless network architecture and determining locations of the plurality of wireless sensor nodes; and radio frequency (RF) circuitry to transmit communications to and receive communications from the plurality of wireless sensor nodes each having a wireless device with a transmitter and a receiver to enable bi-directional communications with the RF circuitry of the apparatus in the wireless network architecture, wherein the one or more processing units of the apparatus are configured to execute instructions to determine ranging data including a set of possible ranges between the apparatus and the plurality of wireless sensor nodes having unknown locations, and to associate each of the apparatus or the wireless sensor nodes with a unique known location within an environment of the wireless network architecture.

In another example of the twelfth embodiment, the one or more processing units of the apparatus are configured to perform a brute force calculation, triangulation, or numerical optimizer algorithm to determine locations of at least a subset of anchor nodes that correspond to the ranging data.

In another example of the twelfth embodiment, the locations of at least a subset of anchor nodes are utilized to adjust at least one of rotation, translation, and mirroring of the anchor locations to align the locations of the anchor nodes to a physical description of the environment of the wireless network architecture.

In another example of the twelfth embodiment, the one or more processing units of the apparatus are configured to perform ranging measurements between the at least subset of anchor nodes and any nodes having an unknown fixed or moving location.

In one example of a thirteenth embodiment, a method for localization of nodes in a wireless network architecture, comprises transmitting, with a wireless node, communications to a plurality of wireless sensor nodes; receiving communications from the plurality of wireless sensor nodes; determining ranging data including a set of possible ranges between the wireless node and the plurality of wireless sensor nodes having unknown locations; and associating each wireless node or wireless sensor node with a unique known location within an environment of the wireless network architecture.

In another example of the thirteenth embodiment, the method of further comprises performing, with the wireless node or a remote device, a brute force calculation, triangulation, or numerical optimizer algorithm to determine locations of at least a subset of anchor nodes that correspond to the ranging data.

In another example of the thirteenth embodiment, further comprises adjusting at least one of rotation, translation, and mirroring of the anchor locations to align the locations of the at least subset of anchor nodes to a physical description of the environment of the wireless network architecture.

In another example of the thirteenth embodiment, the method further comprises performing ranging measurements between the at least one subset of anchor nodes and any nodes having an unknown fixed or moving location.

In another example of the thirteenth embodiment, the method further comprises performing a brute force calculation, triangulation, or numerical optimizer algorithm to use the ranging measurements to determine locations of any nodes having an unknown fixed or moving location.

In one example of a fourteenth embodiment, a system for localization of nodes in a wireless network architecture, comprises a wireless node having a wireless device with one or more processing units and RF circuitry for transmitting and receiving communications in the wireless network architecture; and a plurality of wireless sensor nodes having a wireless device with a transmitter and a receiver to enable bi-directional communications with the wireless node in the wireless network architecture, wherein one or more processing units of the wireless node are configured to execute instructions to determine ranging data including a set of possible ranges between the wireless node and the plurality of wireless sensor nodes having unknown locations, and to associate a set of relative locations within an environment of the wireless network architecture with the wireless node and the plurality of wireless sensor nodes.

In another example of the fourteenth embodiment, the system further comprises a remote device that is external to the environment of the wireless network architecture.

In another example of the fourteenth embodiment, the set of relative locations within an environment of the wireless network architecture are utilized to adjust at least one of rotation, translation, and mirroring of the set of relative locations to align the set of relative locations to a physical description of the environment of the wireless network architecture and set anchor locations.

In another example of the fourteenth embodiment, the remote device or the one or more processing units of the wireless node are configured to perform ranging measurements between the wireless node or at least one wireless sensor node having been set as anchor locations and any nodes having an unknown fixed or moving location.

In another example of the fourteenth embodiment, the ranging measurements include time of arrival ranging measurements or time difference of arrival ranging measurements.

In another example of the fourteenth embodiment, the remote device or the one or more processing units of the wireless node are configured to perform a brute force calculation, triangulation, or numerical optimizer algorithm to use the ranging measurements to determine locations of any nodes having an unknown fixed or moving location.

In one example of a fifteenth embodiment, an apparatus for localization of nodes in a wireless network architecture comprises a memory for storing instructions; one or more processing units to execute instructions for controlling a plurality of wireless sensor nodes in a wireless network architecture and determining locations of the plurality of wireless sensor nodes; and radio frequency (RF) circuitry to transmit communications to and receive communications from the plurality of wireless sensor nodes each having a wireless device with a transmitter and a receiver to enable bi-directional communications with the RF circuitry of the apparatus in the wireless network architecture, wherein the one or more processing units of the apparatus are configured to execute instructions to determine ranging data including a set of possible ranges between the apparatus and the plurality of wireless sensor nodes having unknown locations, and to associate a set of relative locations within an environment of the wireless network architecture with the wireless node and the plurality of wireless sensor nodes.

In another example of the fifteenth embodiment, the set of relative locations within an environment of the wireless network architecture are utilized to adjust at least one of rotation, translation, and mirroring of the set of relative locations to align the set of relative locations to a physical description of the environment of the wireless network architecture and set anchor locations.

In another example of the fifteenth embodiment, the one or more processing units of the apparatus are configured to perform ranging measurements between the apparatus and any nodes having an unknown fixed or moving location.

In another example of the fifteenth embodiment, the one or more processing units of the apparatus are configured to perform a brute force calculation, triangulation, or numerical optimizer algorithm to use the ranging measurements to determine locations of any nodes having an unknown fixed or moving location.

In one example of a sixteenth embodiment, a method for localization of nodes in a wireless network architecture, comprises transmitting, with a wireless node, communications to a plurality of wireless sensor nodes; receiving communications from the plurality of wireless sensor nodes; determining ranging data including a set of possible ranges between the wireless node and the plurality of wireless sensor nodes having unknown locations; and associating a set of relative locations within an environment of the wireless network architecture with the wireless node and the plurality of wireless sensor nodes.

In another example of the sixteenth embodiment, the method further comprises adjusting at least one of rotation, translation, and mirroring of the set of relative locations to align the set of relative locations to a physical description of the environment of the wireless network architecture and set anchor locations.

In another example of the sixteenth embodiment, the method further comprises performing ranging measurements between the wireless node or at least one wireless sensor node having been set as anchor locations and any nodes having an unknown fixed or moving location.

In another example of the sixteenth embodiment, the method further comprises performing a brute force calculation, triangulation, or numerical optimizer algorithm to use the ranging measurements to determine locations of any nodes having an unknown fixed or moving location.

The phrase "at least one of A and B" should be understood to mean "only A, only B, or both A and B." The phrase "at least one selected from the group of A and B" should be understood to mean "only A, only B, or both A and B." The phrase "at least one of A, B, or C" should be understood to mean "only A, only B, only C, or any combination of A, B, or C."

In the foregoing specification, the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A system for localization of nodes in a wireless network architecture, comprising:
   a plurality of wireless anchor nodes each having a known location and a wireless device with one or more processing units and RF circuitry for transmitting and receiving communications in the wireless network architecture; and
   a wireless node having a wireless device with a transmitter and a receiver to enable bi-directional communications with the plurality of wireless anchor nodes in the wireless network architecture, wherein one or more processing units of at least one of the plurality of wireless anchor nodes are configured to execute instructions to determine a set of possible ranges between each anchor node and the wireless node having an unknown location and to perform a triangulation algorithm that iterates through possible locations of the wireless node and eliminates unlikely ranges between each anchor node and the wireless node to minimize error.

2. The system of claim 1, wherein the triangulation algorithm to evaluate the set of possible ranges between each anchor node and the wireless node and to eliminate unlikely ranges between each anchor node and the wireless node.

3. The system of claim 2, wherein the triangulation algorithm to determine a final location for the wireless node with reduced iterations based on eliminating unlikely ranges between each anchor node and the wireless node.

4. The system of claim 1, wherein at least one anchor node to be selected for localization when an error metric that is associated with each distance estimate between an anchor node having a known location and the wireless sensor node having an unknown location is less than or equal to an error threshold.

5. The system of claim 4, wherein at least one anchor node to be eliminated for localization when the error metric is greater than or equal to the error threshold.

6. The system of claim 1, wherein at least one of the anchor nodes comprises a moveable robot that changes positions from a first anchor node position to a second anchor node position during localization.

7. An apparatus for localization of nodes in a wireless network architecture, comprising:
   a memory for storing instructions;
   one or more processing units to execute instructions for controlling a plurality of wireless sensor nodes in a wireless network architecture and determining locations of the plurality of wireless sensor nodes; and
   radio frequency (RF) circuitry to transmit communications to and receive communications from the plurality of wireless sensor nodes each having a wireless device with a transmitter and a receiver to enable bi-directional communications with the RF circuitry of the apparatus in the wireless network architecture, wherein the one or more processing units of the apparatus are configured to execute instructions to determine a set of possible ranges between the apparatus and a wireless sensor node having an unknown location and to perform a triangulation algorithm that iterates through possible locations of the wireless sensor node and eliminates unlikely ranges between each anchor node and the wireless node to minimize error.

8. The apparatus of claim 7, wherein the triangulation algorithm to evaluate the set of possible ranges between the apparatus and the wireless sensor node and to eliminate unlikely ranges between the apparatus and the wireless sensor node.

9. The apparatus of claim 8, wherein the triangulation algorithm to determine a final location for the wireless sensor node with reduced iterations based on eliminating unlikely ranges between the apparatus and the wireless sensor node.

10. The apparatus of claim 7, wherein the one or more processing units of the apparatus are configured to execute instructions to measure a first channel state information of a first frequency channel of a RF signal that is received from the wireless sensor node, to measure second channel state information of a second frequency channel of the RF signal with the first and second frequency channels being non-contiguous or discontinuous channels, to determine delay profile estimation between the apparatus and the wireless sensor node based on the first and second channel state information without phase alignment.

11. The apparatus of claim 10, wherein the delay profile estimation is determined without channel state information for a frequency band gap between the first and second frequency channels.

12. The apparatus of claim 7, wherein the apparatus comprises a moveable robot that changes positions within an indoor environment from a first anchor node position to a second anchor node position during localization.

13. A method for localization of nodes in a wireless network architecture, comprising:
transmitting, with a plurality of wireless anchor nodes each having a known location, communications to a wireless node;
receiving communications from the wireless node;
determining a set of possible ranges between each anchor node and the wireless node having an unknown location; and
performing a triangulation algorithm that iterates through possible locations of the wireless node and eliminates unlikely ranges between each anchor node and the wireless node to minimize error.

14. The method of claim 13, further comprising:
evaluating the set of possible ranges between each anchor node and the wireless node; and
eliminating unlikely ranges between each anchor node and the wireless node.

15. The method of claim 14, further comprising:
determining a final location for the wireless node with reduced iterations based on eliminating unlikely ranges between each anchor node and the wireless node.

16. The method of claim 13, wherein at least one anchor node to be selected for localization when an error metric that is associated with each distance estimate between an anchor node having a known location and the wireless sensor node having an unknown location is less than or equal to an error threshold.

17. The method of claim 16, wherein at least one anchor node to be eliminated for localization when the error metric is greater than or equal to the error threshold.

18. The method of claim 13, wherein at least one of the anchor nodes comprises a moveable robot that changes positions from a first anchor node position to a second anchor node position during localization.

\* \* \* \* \*